(12) United States Patent
Sayer et al.

(10) Patent No.: US 9,194,378 B2
(45) Date of Patent: Nov. 24, 2015

(54) ELECTROMAGNETIC RADIATION COLLECTOR

(71) Applicant: Black Sun Planetary Solutions, Inc., San Diego, CA (US)

(72) Inventors: Timothy James Sayer, Westminster, CO (US); Terrance Vance Yee, San Diego, CA (US); Brian Edwin Copp, Seal Beach, CA (US)

(73) Assignee: Black Sun Planetary Solutions, Inc., San Diego, CA (US)

( * ) Notice: Subject to any disclaimer, the term of this patent is extended or adjusted under 35 U.S.C. 154(b) by 0 days.

(21) Appl. No.: 13/930,012

(22) Filed: Jun. 28, 2013

(65) Prior Publication Data

US 2014/0001766 A1  Jan. 2, 2014

Related U.S. Application Data

(60) Provisional application No. 61/666,298, filed on Jun. 29, 2012.

(51) Int. Cl.
*F24J 2/10*  (2006.01)
*F24J 2/12*  (2006.01)
(Continued)

(52) U.S. Cl.
CPC .. *F03G 6/04* (2013.01); *F03G 6/06* (2013.01); *F24J 2/07* (2013.01); *F24J 2/12* (2013.01);
(Continued)

(58) Field of Classification Search
USPC .......... 126/657, 684, 690, 694, 696, 709, 658
See application file for complete search history.

(56) References Cited

U.S. PATENT DOCUMENTS 3,923,381 A * 12/1975 Winston ................ 359/852
4,134,392 A *  1/1979 Livermore et al. ........... 126/657
(Continued)

FOREIGN PATENT DOCUMENTS

| EP | 2112440 | 10/2009 |
|---|---|---|
| KR | 1020110016923 | 10/2010 |
| KR | 1020100105958 | 2/2011 |

OTHER PUBLICATIONS

Lior, "Thermal Theory and Modeling of Solar Collectors" Cambridge, MA: MIT Press, 1990, p. 159, available at http://ebookbrowse.com/thermal-theory-and-modeling-of-solar-collectors-pdf-d151993484.
(Continued)

*Primary Examiner* — Avinash Savani
*Assistant Examiner* — Vivek Shirsat
(74) *Attorney, Agent, or Firm* — DiBerardino McGovern IP Group LLC

(57) ABSTRACT

An electromagnetic radiation collection apparatus includes an exterior including a bottom portion and first and second walls extending from the bottom portion, the exterior defining a cavity in the bottom portion, the cavity being configured to receive a thermally absorbing material; and a radiation collector. The radiation collector includes a first surface on an interior of the first wall, the first surface being at least partially reflective and positioned to reflect radiation that is incident on the first surface into the cavity; and a second surface on an interior of the second wall, the second surface being at least partially reflective and positioned to reflect radiation that is incident on the second surface into the cavity, where the first and second surfaces face each other to at least partially define an interior region of the radiation collector, and the cavity defines an opening to the interior of the radiation collector.

26 Claims, 23 Drawing Sheets

(51) Int. Cl.
  *F24J 2/46* (2006.01)
  *F03G 6/04* (2006.01)
  *F24J 2/26* (2006.01)
  *F03G 6/06* (2006.01)
  *F24J 2/07* (2006.01)
  *F24J 2/14* (2006.01)
  *F24J 2/51* (2006.01)
  *F24J 2/54* (2006.01)

(52) U.S. Cl.
  CPC .... *F24J 2/14* (2013.01); *F24J 2/26* (2013.01); *F24J 2/51* (2013.01); *F24J 2/541* (2013.01); *F24J 2002/1023* (2013.01); *Y02E 10/42* (2013.01); *Y02E 10/44* (2013.01); *Y02E 10/46* (2013.01)

(56) References Cited

U.S. PATENT DOCUMENTS

| | | | | |
|---|---|---|---|---|
| 4,153,039 | A * | 5/1979 | Carroll | 126/657 |
| 7,077,532 | B1 * | 7/2006 | Diver et al. | 359/871 |
| 7,550,054 | B2 * | 6/2009 | Lasich | 156/254 |
| 8,397,505 | B2 | 3/2013 | Penciu | |
| 8,418,687 | B2 | 4/2013 | Capan | |
| 2004/0055593 | A1 | 3/2004 | Besier | |
| 2007/0283949 | A1 * | 12/2007 | Levin | 126/573 |
| 2009/0013990 | A1 * | 1/2009 | Mattioli | 126/600 |
| 2009/0235985 | A1 * | 9/2009 | Lubart et al. | 136/259 |
| 2009/0283133 | A1 | 11/2009 | Hebrink | |
| 2011/0114083 | A1 * | 5/2011 | Pedretti | 126/657 |
| 2012/0060831 | A1 | 3/2012 | Matalon | |
| 2013/0037072 | A1 | 2/2013 | Powell | |
| 2013/0056000 | A1 | 3/2013 | Perrin | |
| 2013/0098355 | A1 | 4/2013 | Jennings | |

OTHER PUBLICATIONS

Cavity With a Hole, Wikipedia, available at http://en.wikipedia.org/wiki/Black_body#Cavity_with_a_hole, downloaded Jun. 28, 2013.

Black Body Radiation, available at http://quantummechanics.ucsd.edu/ph130a/130_notes/node48.html, downloaded on Jun. 28, 2013.

Bader at al, "An Air-Based Cavity-Receiver for Solar Trough Concentrators," Journal of Solar Energy Engineering, vol. 132, Aug. 2010.

Ideal Radiators, available at http://web.mit.edu/16.unified/www/SPRING/propulsion/notes/node134.html, downloaded Jun. 28, 2013.

International Search Report and Written Opinion of the International Searching Authority for PCT/US2013/048499, mailed Sep. 27, 2013, 14 pages.

* cited by examiner time = t1 time = t2 time = t3

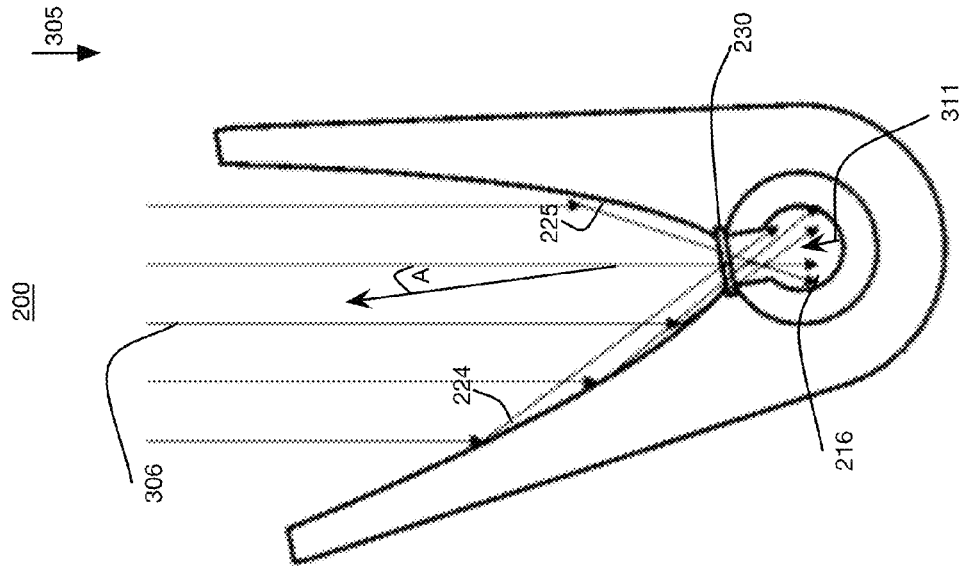
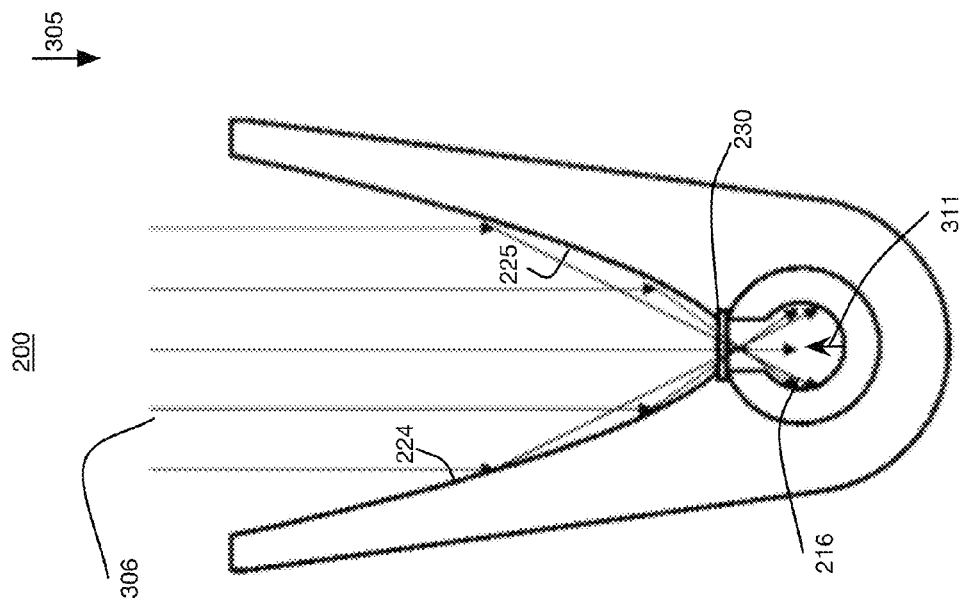
FIG. 3A
FIG. 3B

ELECTROMAGNETIC RADIATION COLLECTOR

CROSS-REFERENCE TO RELATED APPLICATION

This application claims the benefit of U.S. Provisional Application No. 61/666,298, filed on Jun. 29, 2012 and entitled SOLAR COLLECTOR, which is incorporated herein by reference in its entirety.

TECHNICAL FIELD

The disclosed subject matter relates to an electromagnetic radiation collector, such as a solar collector.

BACKGROUND

Solar collectors can track the movement of the sun using optics, such as lenses and mirrors, separate from the solar collector. The separate optical elements are continuously repositioned to track the sun, or other moving electromagnetic radiation source, and the optical elements are aligned and re-aligned as the sun moves so that the optical elements direct and focus the sun onto a vessel that contains a fluid to be heated.

SUMMARY

In one general aspect, an electromagnetic radiation collection apparatus includes an exterior including a bottom portion and first and second walls extending from the bottom portion, the exterior defining a cavity in the bottom portion, the cavity being configured to receive a thermally absorbing material; and a radiation collector. The radiation collector includes a first surface on an interior of the first wall, the first surface being at least partially reflective and positioned to reflect radiation that is incident on the first surface into the cavity; and a second surface on an interior of the second wall, the second surface being at least partially reflective and positioned to reflect radiation that is incident on the second surface into the cavity, where the first and second surfaces face each other to at least partially define an interior region of the radiation collector, and the cavity defines an opening to the interior of the radiation collector.

Implementations can include one or more of the following features.

Radiation that enters the radiation collector at any angle can be reflected toward the cavity without using an optic that is separate from the electromagnetic radiation collection apparatus.

The first and second surfaces can be curved surfaces. The first and second curved surfaces can be parabolas formed from molded sheet metal that includes a reflective coating.

A material can cover the opening and can be positioned between the first surface and the second surface, the material transmitting radiation from the interior of the radiation collector to an interior of the cavity and sealing the cavity. The cavity can include a vessel, and the heat absorbing material can be received in the vessel, and a thermal insulator can at least partially surrounds the vessel. The vessel can be a pipe that defines a longitudinal axis, and the first and second surfaces can extend along the longitudinal axis. The thermal insulator can be between the exterior and the vessel. The thermal insulator can include Styrofoam. The vessel can include fins. The first wall and the second wall can include Styrofoam or sheet metal, the first and second surfaces can include one or more of reflective tape, reflective paint, reflective Aluminum tape, or a metallic material, and the thermal insulator include one or more of fiberglass, calcium silicate, and rockwool.

The first and second surfaces can include one or more of reflective tape, reflective paint, reflective Aluminum tape, sheet metal, polished metal, or sheet metal having a reflective coating.

The first wall and the second wall can include one or more of Styrofoam or sheet metal, and the first and second surfaces include one or more of reflective tape, reflective Aluminum tape, reflective paint, or a metallic material.

The first and second surfaces can reflect sunlight.

The first and second walls can be integral with the bottom portion and the radiation collection apparatus is a single piece.

The electromagnetic radiation collection apparatus can include an optically absorbing material.

In another general aspect, an electromagnetic radiation collection apparatus includes a collector including at least one wall extending from a bottom portion that defines a cavity, the at least one wall being adjacent to a space through which radiation passes to reach the at least one wall; and a vessel in the cavity, the vessel configured to receive a thermally absorbing material, where the cavity defines an opening to the space, and the at least one wall includes a reflective surface that is positioned to receive radiation directly from a source of radiation without using optics that are separate from the reflective surface and the reflective surface is positioned to reflect the received radiation through the opening and into the vessel.

Implementations can include one or more of the following features.

The electromagnetic radiation collection apparatus can include a cover over the opening, the cover transmitting radiation reflected from the reflective surface into the vessel and forming a sealed boundary between the opening and the space.

The reflective surface can reflect sunlight, and the cover can transmit sunlight.

In another general aspect, a method of generating electricity includes receiving sunlight at two curved reflectors that face each other and define an interior of a solar collector, the curved reflectors positioned to reflect the received sunlight into a cavity positioned below the two curved reflectors, the cavity including a vessel that receives a thermally absorbing material; receiving the radiation reflected from the two curved reflectors through an opening in the cavity, the opening in the cavity being covered by a material that transmits the reflected sunlight and seals the cavity; heating the thermally absorbing material; and providing the heated vapor to a vapor-powered heat engine that is connected to an electric generator to generate electricity.

In another general aspect, a solar radiation collector includes an exterior including a bottom portion and first and second walls extending from the bottom portion, the exterior defining a cavity in the bottom portion; a first surface on an interior of the first wall, the first surface being at least partially reflective and positioned to reflect sunlight that is incident on the first surface toward the cavity; a second surface on an interior of the second wall, the second surface being at least partially reflective and positioned to reflect sunlight that is incident on the second surface toward the cavity, the first surface and the second surface facing each other and defining a space therebetween; a pipe disposed in the cavity, the pipe configured to receive a thermally absorbing material; an insulating material between the pipe and the bottom portion; and a cover positioned over an opening formed between the cavity and the space, the cover sealing the cavity from the space and the cover being transparent to sunlight.

Implementations can include the following feature.

The solar radiation collector can include an optical absorbing material on one or more of an inner surface of the cavity and an outer surface of the pipe.

Implementations of any of the techniques described above can include a solar collector, a method of supplying electricity from a solar collector, a kit for retrofitting an existing solar collector, a method, a process, a device, a system, executable instructions stored on a computer readable medium, or an apparatus. The details of one or more implementations are set forth in the accompanying drawings and the description below. Other features will be apparent from the description and drawings, and from the claims.

DRAWING DESCRIPTION

FIGS. 3A and 3B show cross-sectional views of the solar collector of FIG. 2A.

Like reference numbers refer to like elements.

DESCRIPTION

A solar collector is described. The solar collector collects electromagnetic radiation, such as from the sun (sunlight), and heats a thermally absorbing material (such as water) by directing the electromagnetic radiation into a cavity. The cavity includes a vessel (such as a pipe) that holds the thermally absorbing material. The thermally absorbing material can be any material, in liquid, solid, and/or gas phase, that absorbs heat from the surrounding region or from direct contact with a warmer object. After being heated, the energy in the heated thermally absorbing material can be passed to a generator to produce electricity.

As discussed in greater detail below, the solar collector uses two reflective surfaces to direct sunlight into the cavity without using separate and additional optical elements (such as focusing mirrors and/or lenses). The cavity can be covered with a plate, cover, material, or other barrier that transmits sunlight and forms a fluid-tight, or nearly fluid-tight, boundary between the cavity and a region between the two reflective surfaces. The cover traps fluid, such as air, other gasses, and liquids, in the cavity. The trapped fluid fills the cavity and surrounds the pipe that holds the thermally absorbing material (such as water). The trapped fluid that fills the cavity aids in heating the pipe.

Sunlight reflected from the two reflective surfaces passes through the cover into the cavity. An optical absorbing material that is in the cavity absorbs the sunlight that enters the cavity. The optical absorbing material can be, for example, a dark paint that is on interior surface of the cavity, a dark paint that is on the outer surface of the vessel, and/or an opaque material that is dispersed in the fluid that fills the cavity and surrounds the vessel. The optical absorbing material converts the absorbed sunlight to heat and emits the heat into the cavity. The heat that is emitted from the optical absorbing material is transmitted to the vessel via radiation and/or convection. Additionally, the presence of the cover also helps to heat the fluid that fills the cavity and surrounds the vessel by trapping heated fluid in the cavity, where the fluid can be heated further by additional exposure to sunlight.

Due to the structural arrangement of the solar collector, a separate focusing and/or steering optic is not needed to direct the sunlight into the cavity and/or onto the vessel. Thus, solar collector can operate in an effective manner even when positioned in an off-axis orientation. Furthermore, the cavity and vessel are placed in a lower portion of the solar collector (the portion of the solar collector that is further from the electromagnetic radiation source than the reflective surfaces), eliminating the need for a separate support structure for holding the vessel in a space between the reflective surfaces.

Figure 1A:
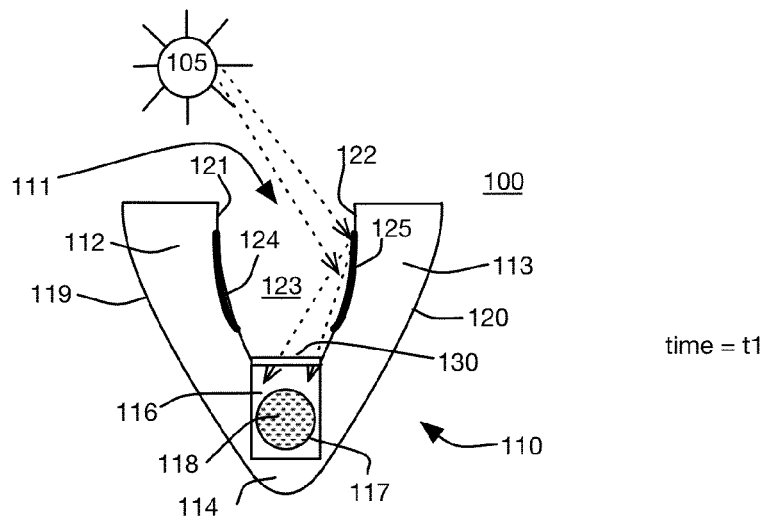
FIGS. 1A-1C show cross-sectional plan views of an exemplary solar collector in which the progression of the sun relative to the exemplary solar collector is shown.
Figure 1B:
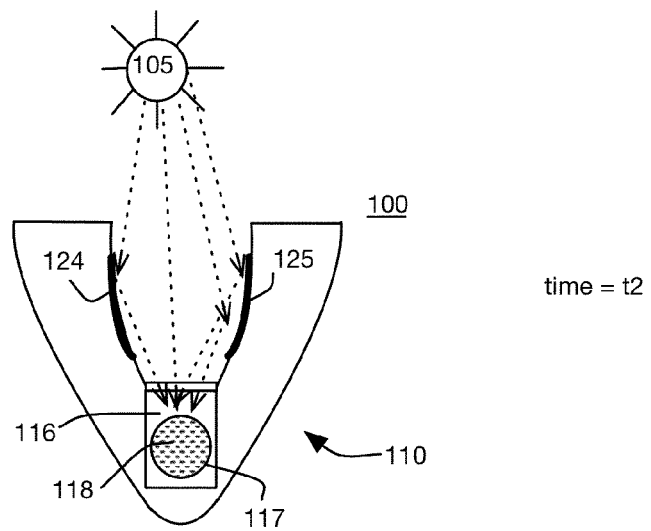
Figure 1C:
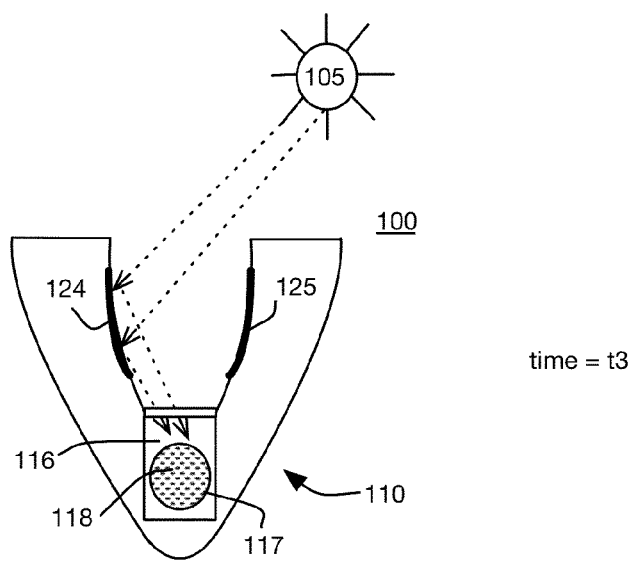

Referring to FIGS. 1A-1C, a cross-sectional view of an exemplary solar collector 100 is shown. The solar collector 100 receives radiation from a radiation source 105. In the example shown in FIGS. 1A-1C, the radiation source 105 is the sun. Over time, the radiation source 105 moves relative to the solar collector 100, with the radiation source 105 being at a first position at the time t1 (FIG. 1A), a second position at the time t2 (FIG. 1B), and a third position at the time t3 (FIG. 1C).

The solar collector 100 includes a structure 110 that has walls 112, 113 and a bottom portion 114. The walls 112, 113 extend from the bottom portion 114 and define an opening 111 at the portion of the solar collector 100 that is closest to the radiation source 105. The bottom portion 114 is further away from the radiation source 105 than the opening 111. The bottom portion 114 and the opening 111 are at opposite ends of the solar collector 100.

The bottom portion 114 defines a cavity 116 that houses a vessel (such as a pipe) 117. The vessel 117 holds a thermally absorbing material 118. The thermally absorbing material 118 is heated by the radiation that the solar collector 100 gathers. The thermally absorbing material 118 can be heated, for example, into a heated gas that can drive a turbine or other mechanism to generate electric power, provide heating for industrial processes, or provide climate control.

The thermally absorbing material 118 can be, for example, water, a mixture of water and air, a gas entrained in a liquid, a liquid with solid particles or a solid component, a solid, a gel or gel-like material, or any other material that absorbs heat. The thermally absorbing material 118 can be or include hydrocarbon oils, such as, for example, paraffin or mineral oil; a water/glycol solution; air; one or more chlorofluorocarbon (CFC) type refrigerant; one or more alcohol, such as, for example, isopropyl alcohol (IPA) or Ethyl Alcohol; a molten salt; or a plurality of molten salts. The thermally absorbing material 118 can be a combination of any of these substances. The thermally absorbing material 118 can change phase after absorbing a sufficient amount of heat.

The walls 112, 113 extend from the bottom portion 114. The walls 112, 113 have exterior surfaces 119, 120, respectively, and interior surfaces 121, 122, respectively. The interior surfaces 121 and 122 face each other to partially define an interior region 123 of the solar collector 100. The interior surface 121 has a reflective surface 124, and the interior surface 122 has a reflective surface 125. The reflective surfaces 124 and 125 reflect sunlight and other radiation from the radiation source 105 into the cavity 116.

The cavity 116 is covered with a plate (or cover) 130. The cover 130 is optically transparent to the radiation from the radiation source 105 and forms a fluid-tight boundary between the region 123 and the cavity 116. Thus, the cover 130 allows radiation to pass into the cavity 116 while also trapping and/or retaining fluid in the cavity 116. For example, the cover 130 can allow sunlight to enter the cavity 116 and also trap air and other gases in the cavity 116.

The cover 130 can be any material, assembly of materials, or composition of material that transmits sunlight into the cavity 116 and prevents, or greatly inhibits, heat transfer out of the cavity 166. For example, the cover 130 can be a single pane of glass, Lucite (available from Lucite International, Inc. of Mississippi), a plurality of panes of glass (for example, a double or triple pane of glass) or other transparent material that is vented in between, or a plurality of panes of glass or other transparent material that has a vacuum between the two panes of material. The cover 130 can be a flat plate. In some implementations, the cover 130 can include one or more curved surfaces such that the cover 130 is not completely planar.

The cavity 116 can be considered to be an approximation of a blackbody cavity. Light that enters a blackbody cavity is reflected internally one or more times, with the interior walls of the blackbody cavity absorbing some or all of the energy in each reflection. Eventually, all, or nearly all, of the light that entered the blackbody cavity is absorbed by the interior walls. The absorbed light heats the interior walls, and the walls transfer the heat to the cavity by convection and/or radiation, with convection being the dominant process. Little or no light escapes from the blackbody.

The cavity 116 is implemented as an approximation of a blackbody cavity. Sunlight enters the cavity 116 and can be reflected from the interior walls, making one or more passes through the cavity 116. The interior walls of the cavity 116 also absorb energy in the light that passes within the interior of the cavity 116. The interior walls into the cavity 116 can reemit the absorbed energy into the cavity 116 as heat. Little, if any, of the sunlight exits the cavity 116 through the cover 130. In this manner, the cavity 116 can behave similarly to a blackbody cavity.

The placement of the cover 130 over the opening between the cavity 116 and the region 123 assists in the retaining heat in the cavity 116. The cover 130 eliminates or reduces convective losses that could otherwise occur at the interface between the cavity 116 and the region 123. As such, the sunlight that enters the cavity 116 heats the fluid in the cavity that is trapped by the cover 130, which further heats the vessel 117, and the thermally absorbing material 118 that is in the vessel 117, by, for example, convection. In this manner, the thermally absorbing material 118 can be heated when radiation reflected from the reflective surfaces 124 and/or 125 is reflected into the cavity 116 but does not fall directly on the vessel 117 or the thermally absorbing material 118.

As a result, the solar collector 100 can collect radiation and heat the thermally absorbing material 118 without using separate optical elements (such as mirrors and/or lenses) to focus radiation directly onto the vessel 117 or the thermally absorbing material 118. Additionally, placement of the cavity 116 in the bottom portion 114 allows the vessel 117 to be held without placing a support structure in the region 123. For example, the placement of the cavity 116 and the vessel 117 at the bottom of the solar collector 100 allows the thermally absorbing material 118 to be exposed to radiation without the vessel 117 being suspended in the interior 123 of the solar collector 100.

As shown in FIGS. 1B and 1C, the solar collector 100 continues to collect radiation from the source 105 even as the source 105 moves relative to the solar collector 100. The relative arrangement of the cavity 116, the cover 130, and the reflective surfaces 124 and 125 to each other allows the solar collector to collect radiation and heat the thermally absorbing material 118 even as the source 105 moves relative to the solar collector 100. Instead of requiring relatively precise alignment between the vessel 117 and the radiation source 105, the solar collector 100 can collect radiation and utilize the collected radiation to heat the thermally absorbing material 118 when the angle between the solar collector 100 and the incoming radiation rays is less than the acceptance angle of the solar collector 100. The acceptance angle can be, for example, 5°, 10°, 30°, 54°, 64°, or any angle between 5° and 85°. The acceptance angle can be up to 180°. The acceptance angle is a metric of the solar incidence angles that can enter the solar collector. For example, a solar collector that has an acceptance angle of 10° accepts sun having an incidence angle of 0°+/−5°. Elements 1121 and 1123 of FIGS. 5E and 5F show an example of two angles that, together, form an acceptance angle for a solar collector. In some implementations, one or more of the reflective surfaces 124 and 125 are curved.

In these implementations (such as the implementation shown in FIGS. 5A-5F), the reflective surfaces can have a focal point. However, because the cavity 116 allows utilization of radiation that enters the cavity 116 in many locations, even if the reflective surfaces 124 and/or 125 form a focal point, the vessel 117 does not have to be located at the focal point. Moreover, in some implementations, the solar collector 100 can collect radiation even if all or most of the radiation from the source 105 falls on only one of the reflective surfaces 124, 125.

Figure 2A:
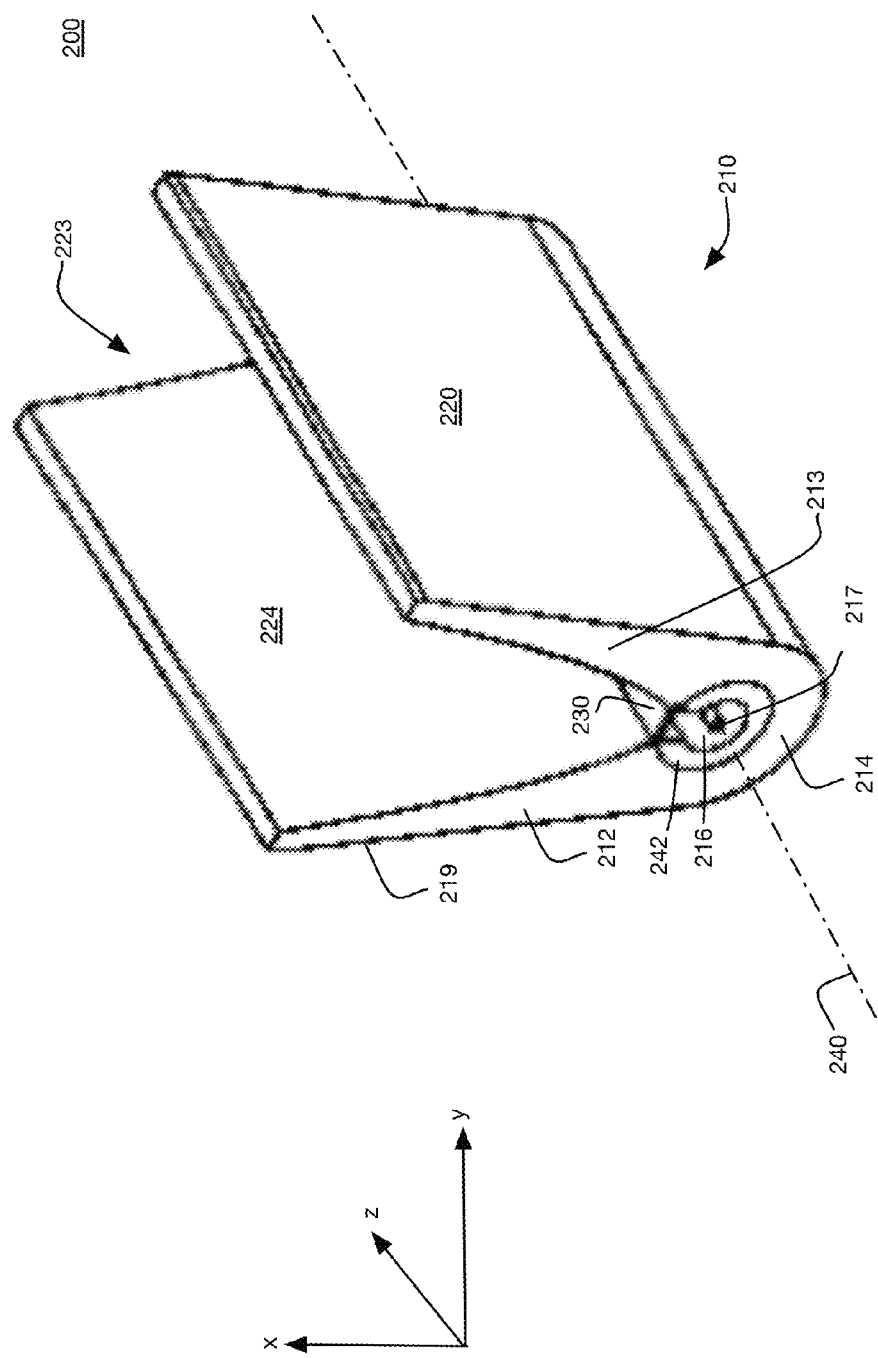
FIG. 2A shows a perspective view of another exemplary solar collector.
Figure 2B:
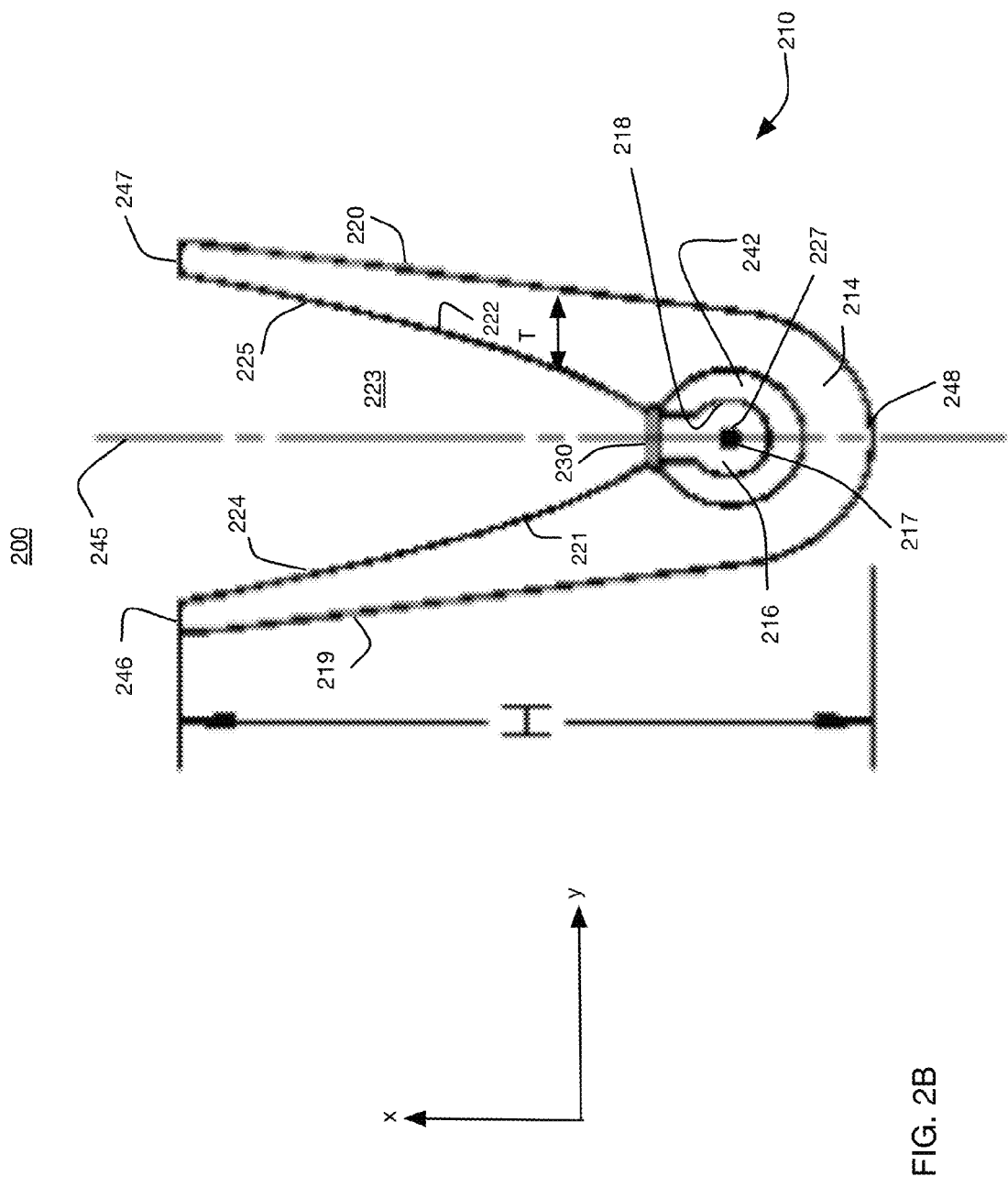
FIG. 2B shows a cross-sectional plan view of the solar collector of FIG. 2A.
Figure 2D:
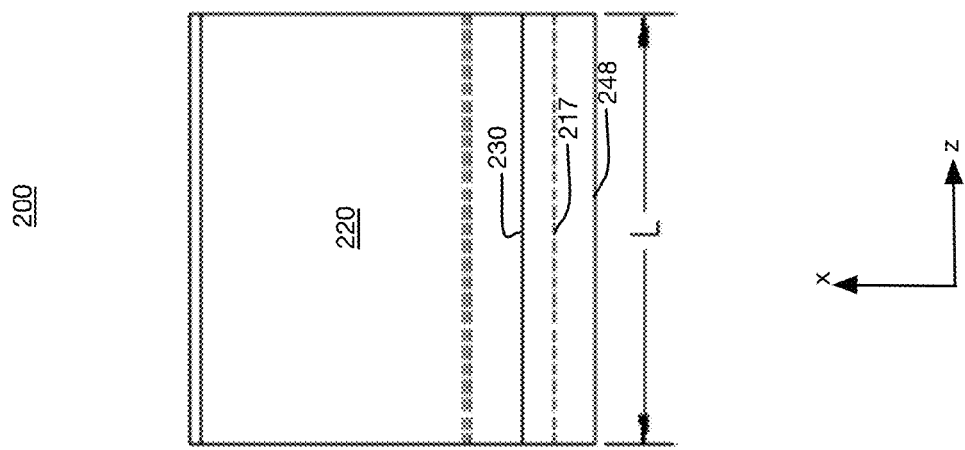
FIG. 2D shows a side view of the solar collector of FIG. 2A.
Figure 2C:
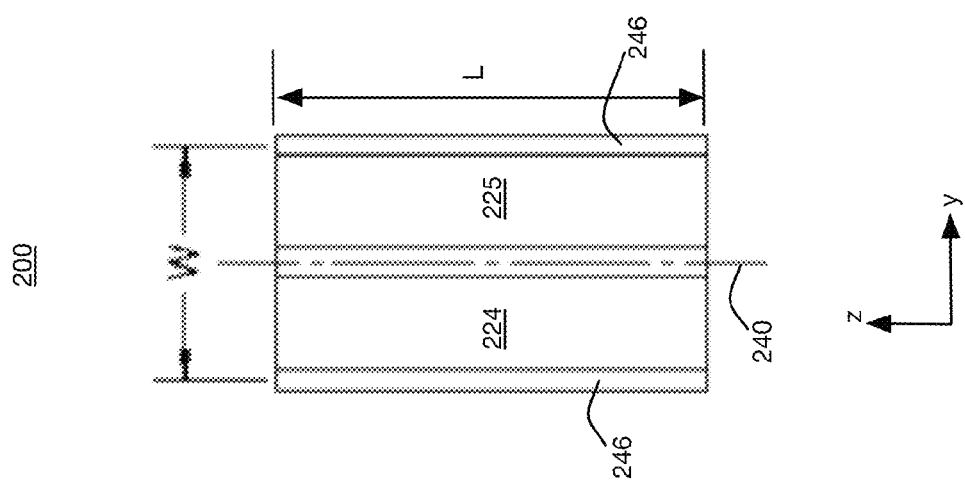
FIG. 2C shows a top plan view of the solar collector of FIG. 2A.

FIGS. 2A-2D show another exemplary solar collector 200. FIG. 2A shows a perspective view of the solar collector 200, FIG. 2B shows a cross-sectional view of the solar collector 200 in the plane x-y, FIG. 2C shows a top plan view of the solar collector 200 in the plane z-y, and FIG. 2D shows a side plan view of the solar collector 200 in the x-z plane.

Referring to FIG. 2A, the solar collector 200 includes a structure 210 having a bottom portion 214 and walls 212, 213 that extend upward from the bottom portion 214. The bottom portion 214 defines a cavity 216 that has a pipe 217 that is capable of receiving, holding, transporting, and/or passing a thermally absorbing material (not shown). The thermally absorbing material can be any type of fluid that can be used as a working fluid, such as water or alcohol. In the solar collector 200, the pipe 217 defines a longitudinal axis 240 that extends in the "z" direction. The pipe 217 and the cavity 216 are centered on the longitudinal axis 240. The cavity 216 and the walls 212 and 213 extend along the direction of the longitudinal axis 240.

The walls 212 and 213 each have an outer surface and an inner surface. The inner surfaces face each other and are at least partially covered with, coated with, or made from a material that reflects sunlight to form reflective surfaces 224 and 225 (FIG. 2B). The reflective material of the reflective surface can be, for example, sheet metal, any metal, any polished metal, reflective tape, a reflective film, a reflective paint, or a reflective coating.

The reflective surfaces 224 and 225 define two sides of an interior region 223 of the solar collector 200. The interior region 223 is defined at a bottom side by a cover 230. The cover 230 extends along the longitudinal axis 240 and spans a space between the walls 212 and 213. The cover 230 forms a fluid-tight, or nearly fluid-tight, boundary between the cavity 216 and the interior region 223. The cover 230 is made from any material, such as glass, plastic, or Plexiglas, that is transparent to sunlight and impervious to fluid. As such, the cover 230 allows sunlight or other radiation to enter the cavity 216 and the cover 230 traps fluid (such as air) in the cavity 216. The trapped fluid is heated by the sunlight that enters the cavity through the cover 230.

The bottom portion 214 also includes an insulator 242 in or partially surrounding the cavity 216. The insulator 242 can be any material that is thermally insulating. For example, the insulator 242 can be a polymer foam, fiberglass, and/or Styrofoam. The insulator 242 can be an insulator that withstands high temperatures, such as calcium silicate, mineral wool, rockwool fiberglass, or any type of pipe insulation. The insulator 242 can have a coating 218 on a side of the insulator 242 that is closer to the pipe 217 and faces the cavity 216. The coating 218 is capable of withstanding high temperatures and absorbs solar radiation. The coating 218 can be, for example, black paint that withstands high temperatures or any other material or coating that can attach to the inner surface of the insulator 242 and provide improved absorption of radiation (sunlight).

In some implementations, the thermally absorbing material in the pipe 217 is water. When the pipe 217 is heated, the water is also heated and can be converted into steam. The exterior of the pipe 217 can become warm and is insulated with the insulator 242 to protect the bottom portion 214 of the structure 210. Using a high temperature pipe insulator, such as fiberglass, calcium silicate, or mineral wool, can provide improved insulation of the pipe 217 and can reduce the amount of heat that reaches the bottom portion 214. In these implementations, the presence of the insulator 242 allows the bottom portion 214 to be made from a material that has a low temperature tolerance and would melt or otherwise degrade if exposed to the heat from the pipe 217. For example, employing the high temperature insulator can allow the bottom portion 214 to be made from Styrofoam.

In other implementations, the thermally absorbing material in the pipe 217 is a material that is converted into a gaseous state at a relatively low temperature. For example, the thermally absorbing material can be ethanol, which has a boiling point of 78.3° C. as compared to the 100° C. boiling point of water. Thus, when ethanol is the thermally absorbing material, the exterior of the pipe 217 can be relatively cooler than when water is the thermally absorbing material, because the pipe 217 does not have to be heated as much to convert ethanol into vapor. As a result, the exterior of the pipe 217 is cooler, allowing materials that are relatively less heat tolerant to be used as the insulator 242 and/or the bottom portion 214.

Referring also to FIG. 2B, which shows a cross-sectional view of the solar collector 200 in the x-y plane, the insulator 242 and the cover 230 do not overlap completely. In other words, at least some of the radiation that passes through the cover 230 is not blocked and/or absorbed by the insulator 242. The insulator 242 is between the bottom portion 214 of the structure 210 and the cavity 216. The insulator 242 extends in the "z" direction along the longitudinal axis 240. In the example shown, the insulator 242 extends along the entire length of the cavity 216.

The solar collector 200 has mirror symmetry along a vertical axis 245. The vertical axis 245 is also referred to as the centerline of the solar collector 200. The solar collector 200 also has an extent "H" in the "x" direction. The extent "H" is the maximum distance between the bottom portion 214 and an end of either of the walls 212, 213. For the solar collector 200, the walls 212 and 213 are identical to each other. The walls 212 and 213 have ends 246, 247, respectively, that are the same, or nearly the same, distance from an edge 248 of the bottom portion 214.

The walls 212 and 213 have a thickness "T" that is the distance between inner surfaces 221, 222 and exterior surfaces 219, 220. The thickness "T" has a maximum extent at a location where the walls 212 and 213 meet the cover 230. The thickness "T" decreases toward the ends 246 and 247. Thus, in the x-y plane, the interior region 223 is narrowest where the interior region 223 meets the cover 230 and widest between the ends 246 and 247 (shown as width "W" in FIG. 2C).

Referring also to FIG. 2C, a top view of the solar collector 200 in the z-y plane is shown. The cavity 216 has an extent "L" in the "z" direction. The cavity 216 extends along and is centered on the longitudinal axis 240. The extent "L" represents the length (longitudinal extent) of the cavity 216 and the length of the portion of the solar collector 200 that concentrates sunlight to heat the cavity 216 and the pipe 217. The ends 246, 247 of the walls 212, 213, respectively, are equally, or nearly equally spaced, from the longitudinal axis 240. FIG.

2D shows a side view of the exterior surface 220. The exterior surface 219 is the same, or nearly the same. The exterior surfaces 220 and 219 also have an extent of "L" in the "z" direction.

Figure 2E:
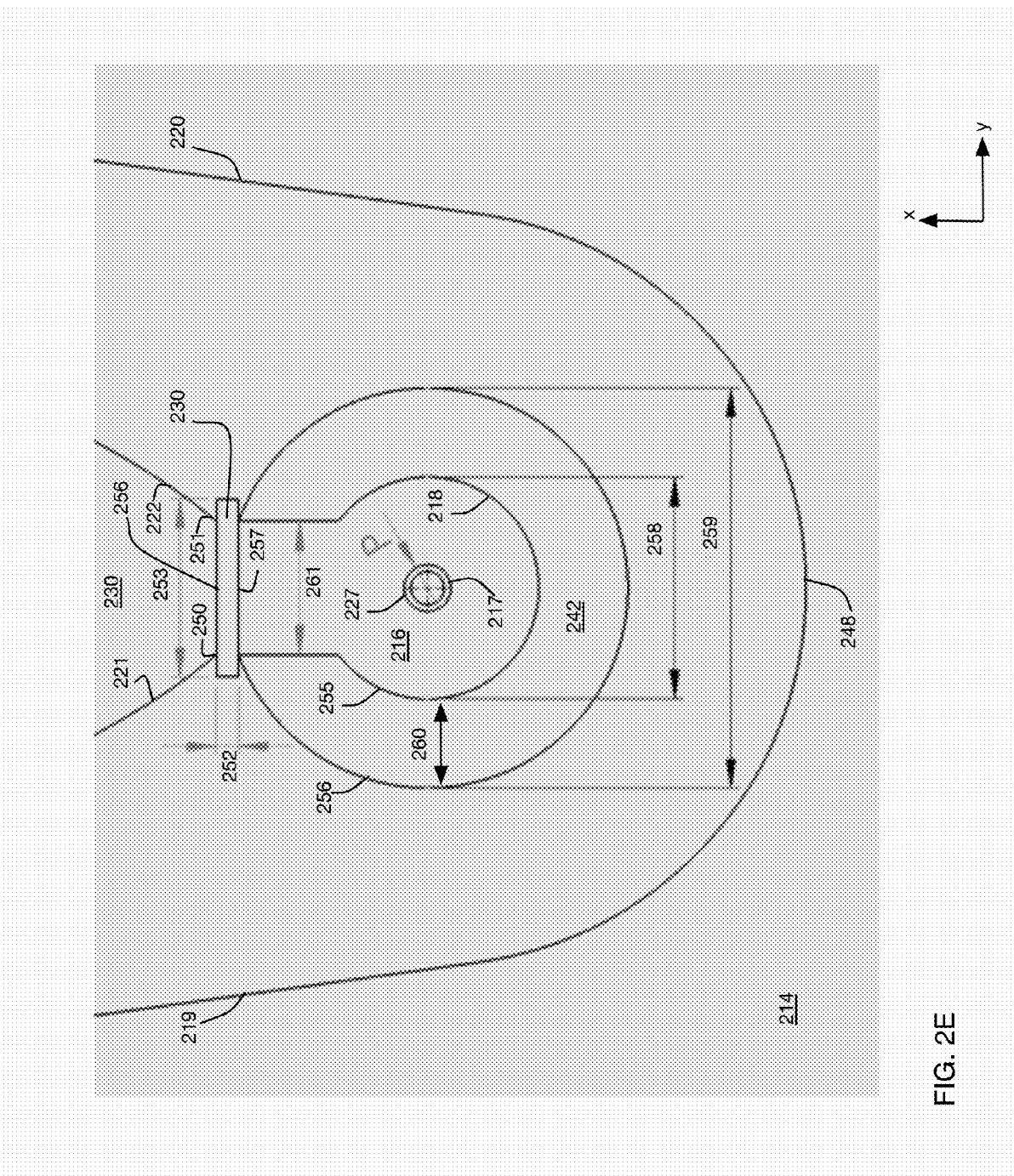
FIG. 2E shows a cross-sectional view of a bottom portion of the solar collector of FIG. 2A.

Referring also to FIG. 2E, a cross-sectional view of the bottom portion 214 of the structure 210 is shown. The cover 230 is placed between the inner surfaces 221 and 222. The cover 230 provides a fluid-tight boundary between the cavity 216 and the interior region 223 of the solar collector 200. The cover 230 spans an opening between an end 250 of the inner surface 221 and an end 251 of the inner surface 222. The cover 230 has an extent 253 in the "y" direction between the ends 250 and 251. The cover 230 also has a thickness 252 in the "x" direction. The cover has a side 256 that faces the interior region 223 and a side 257 that faces the cavity 216. The side 256 contacts the walls 212 and 213. The cavity 216 also includes the pipe 217, which has a diameter of "P."

The insulator 242 partially surrounds the cavity 216, and an outer side 256 of the insulator 242 makes contact with the side 257 the cover 230. The insulator 242 also has an inner side 255. The optical absorbing coating 218 is on the inner side 255 and faces the cavity 216. The pipe 217 also has an optical absorbing coating on a surface 227. The surface 227 is exposed to the cavity 216, and the surface 227 can receive direct radiation through the cover 230. The insulator 242 has an inner diameter 258, an outer diameter 259, and a thickness 260. The insulator 242 is fitted to the cavity 216 and insulates the cavity 216 and the pipe 217 against thermal losses. The insulator 242 does not overlap completely with the cover 230, and a gap 261 in the insulator 242 allows radiation that is incident on the side 256 of the cover 230 to pass into the cavity 216.

Referring to FIGS. 3A and 3B, side cross-sectional views of the solar collector 200 are shown. FIG. 3A shows the solar collector 200 oriented with a surface normal 311 of the bottom of the cavity 216 parallel to a direction 305 in which rays 306 from a radiation source (not shown) propagate. FIG. 3B shows the solar collector 200 oriented with the surface normal 311 of the cavity 216 at an angle "A" relative to the direction 305. In the example shown in FIG. 3B, the solar collector 200 can be considered to be collecting radiation while in an "off-axis" orientation.

The reflective surfaces 224 and 225 direct incident sunlight to the cavity 216. No additional pointing or direction optics are needed, because the collected sunlight can be utilized to heat the pipe 217 and the fluid in the pipe 217 regardless of where the sunlight enters the cavity 216. Because all of the collected sunlight is not required to be directly focused on the pipe 217, the solar collector 200 does not have to include additional pointing optics that track the position of the sun.

Thus, although the rays 306 enter the cavity 216 at a different angle in the orientation shown in FIG. 3A than in the orientation shown in FIG. 3B, the reflective surfaces still funnel the sunlight into the cavity 216 through the throat opening 261 (FIG. 2E). The solar collector 200 can operate in an off-axis orientation as long as the angle "A" is less than the acceptance angle of the collector 200. Elements 1121 and 1123, taken together, of FIGS. 5E and 5F illustrate an example of an acceptance angle for a solar collector.

Figure 4A:
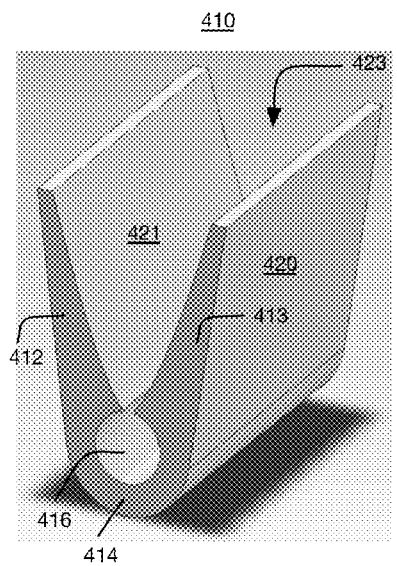
FIG. 4A shows a perspective view of an exemplary structure used in a solar collector.
Figure 4B:
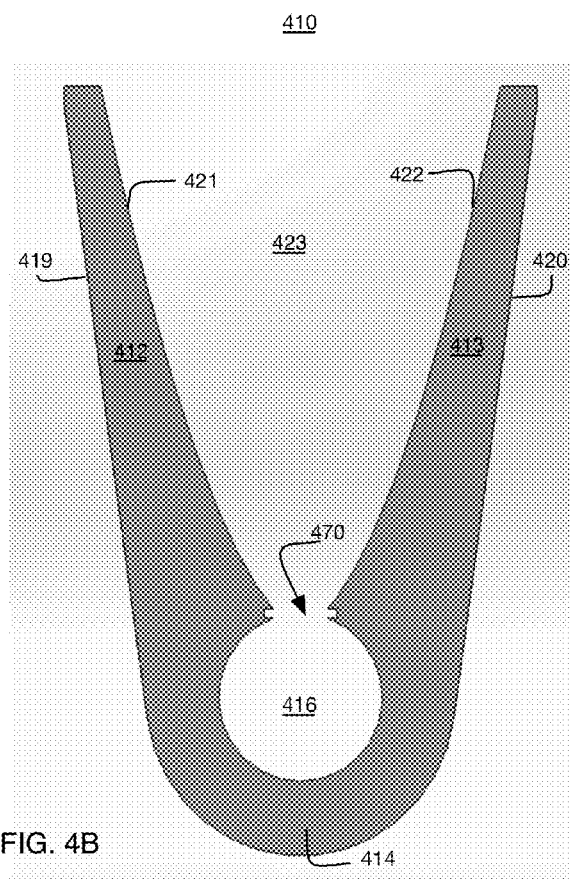
FIG. 4B shows a cross-sectional view of the structure of FIG. 4A.
Figure 4C:
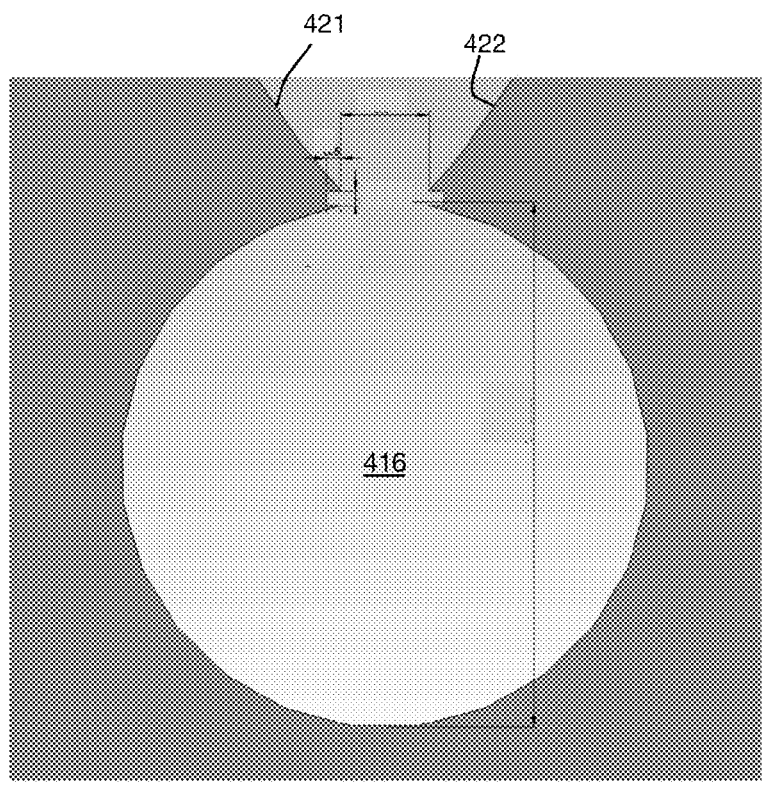
FIGS. 4C and 4D show a cross-sectional view of a portion of the structure of FIG. 4A.
Figure 4D:
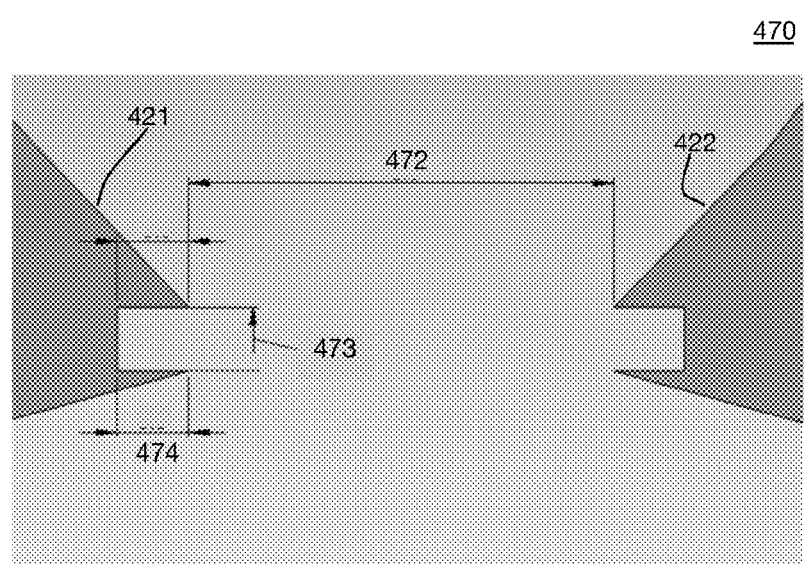
Figure 4E:
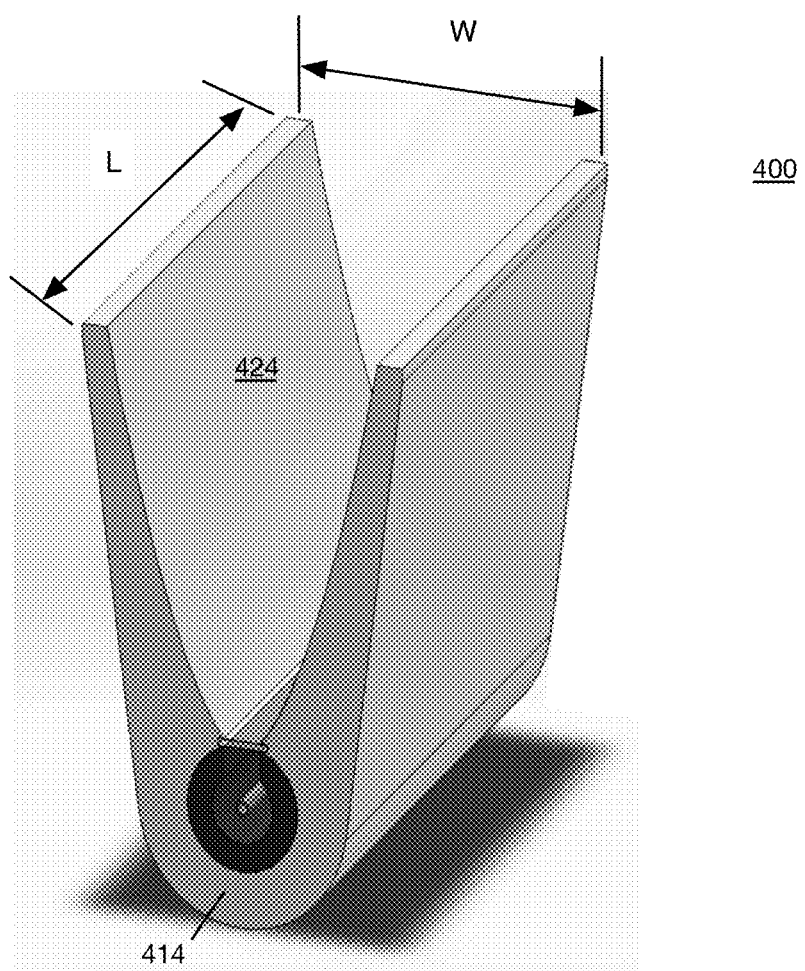
FIG. 4E shows another exemplary solar collector that includes the structure of FIG. 4A.
Figure 4F:
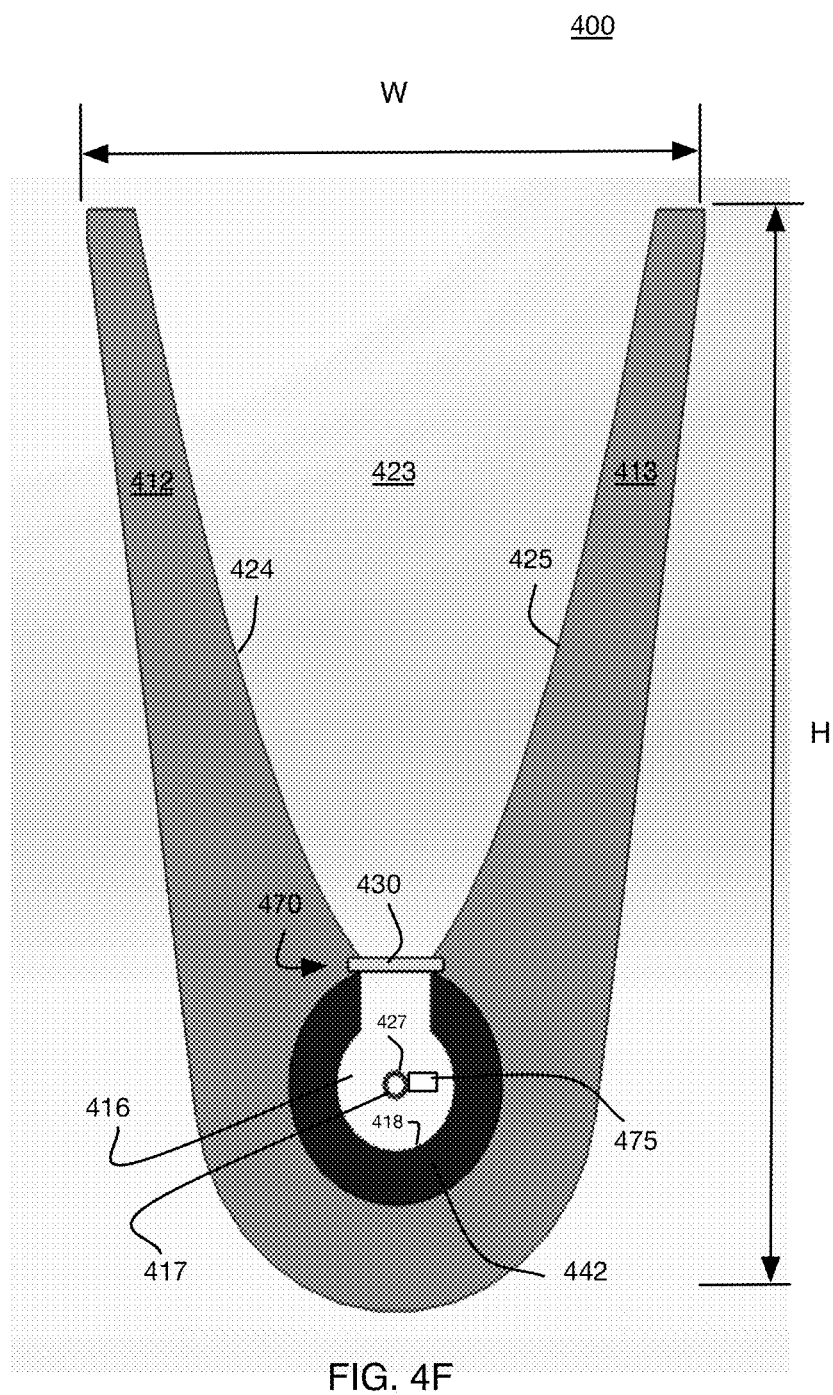
FIG. 4F shows a cross-sectional view of the solar collector of FIG. 4E.

Referring to FIGS. 4A-4D, a structure 410 for another exemplary solar collector 400 is shown. FIG. 4A shows a perspective view of the structure 410, FIG. 4B shows a cross-sectional view of the structure 410, FIG. 4C shows a cross-sectional view of a bottom portion 414 of the structure 410, and FIG. 4D shows a cross-sectional view of a cover holder 470. FIGS. 4E and 4F show perspective and cross-sectional views, respectively, of the solar collector 400 as assembled.

As discussed below, the cover holder 470 is formed only from the structure 410. Thus, the cover holder 470 allows a cover 430 (FIGS. 4E and 4F) to be held by the structure 410 only and without contacting other elements of the solar collector 400. Furthermore, the solar collector 400 is sized so that the collector 400 can be installed, transported, maintained, and otherwise managed by one person.

Referring to FIGS. 4A and 4B, the structure 410 includes the bottom portion 414, and walls 412 and 413 that extend upward from the bottom portion 414. The bottom portion 414 defines a cavity 416. The structure 410 can be made from any durable and/or lightweight material. For example, the structure 410 can be made from Styrofoam or another polymer foam. The walls 412 and 413 have inner surfaces 421 and 422, respectively, and outer surfaces 419 and 420, respectively. The structure has a width 477, a height 478, and a length 479. The width can be, for example, 44 inches (1.12 m), and the height can be, for example, 49 inches (1.24 m). The length 479 can be, for example, 88 inches (2.23 m).

Referring also to FIGS. 4C and 4D, the inner surfaces 421, 422 and the cavity 416 define the cover holder 470. The cover holder 470 is an opening between the cavity 416 and a region 423 that is between the inner surfaces 421 and 422. The cover holder 470 has a width 472, a height 473, and extends into the structure 410 by an extent 474. The width 472 can be, for example, between 3 inches (7.62 cm) and 6 inches (15.24 cm). The height 473 can be, for example, 0.5 inches (1.27 cm), and the extent 474 can be, for example, 0.5 inches (1.27 cm).

Referring to FIGS. 4E and 4F, the assembled solar collector 400 is shown. FIG. 4E shows a perspective view of the solar collector 400, and FIG. 4F shows a cross-sectional view of the solar collector 400. The solar collector 400 includes the structure 410 and the cavity 416. The cavity 416 includes a pipe 417, and an insulator 442 partially surrounds the pipe 417. The insulator 442 is between the bottom portion 414 and the cavity 416. In the example shown in FIGS. 4E and 4F, the insulator 442 does not make physical contact with the pipe 417. However, in other implementations, the insulator 442 can contact the pipe 417. The temperature of the pipe 417 and/or a thermally absorbing material in the pipe 417 can be monitored with a thermal sensor 475. Although only one thermal sensor 475 is shown, multiple thermal sensors 475 can be placed on the pipe 417.

The solar collector 400 also includes the cover 430, which is held by the cover holder 470. In the exemplary solar collector 400, the cover 430 is held completely by the structure 410 and does not make direct physical contact with the insulator 442. The solar collector 400 also includes reflective surfaces 424 and 425. The reflective surfaces 424 and 425 are mounted onto the inner surfaces 421 and 422, respectively. The reflective surfaces 424 and 425 can be, for example, an aluminum-backed reflector that is bendable to match a curve on the inner surfaces 421 and 422. The aluminum backing of each of the reflective surfaces 424 and 425 contacts the inner surface 421, 422, respectively, and a reflective side of each of the reflective surfaces 424 and 425 faces the region 423.

The cavity 416 can have a coating 418 that absorbs sunlight. The coating 418 can be, for example, a dark paint. Additionally or alternatively, an outer surface 427 of the pipe 417 that is exposed to the cavity 416 can be coated with a coating that absorbs sunlight, similar to the coating 418. In some implementations, a material that is opaque to sunlight (and absorbs sunlight) is distributed throughout the cavity 416. The presence of the coating 418, the coating on the surface 427 of the pipe 417, and/or the opaque material improves the absorption of the sunlight that enters the cavity 416 and produces more heat in the cavity 416. The additional heat causes the pipe 417 to heat by convention (in addition to any direct radiation that the pipe 417 may receive), and this also increases the heating of the thermally absorbing material that is in the pipe 417.

Figure 5A:
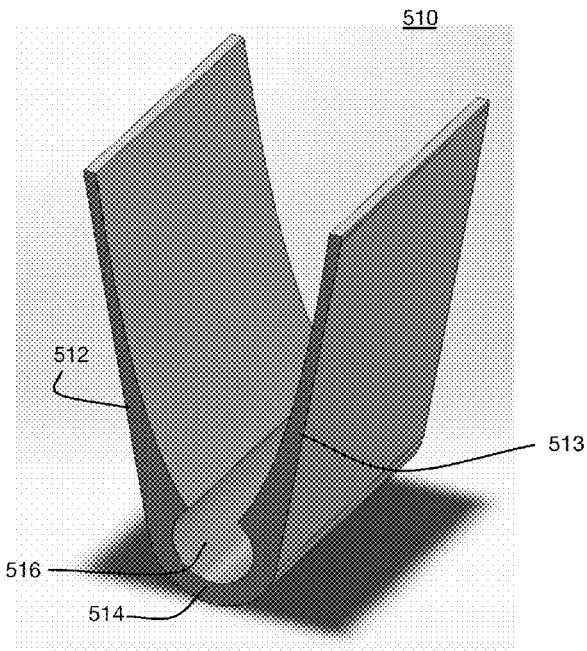
FIG. 5A shows a perspective view of another exemplary structure used in a solar collector.
Figure 5B:
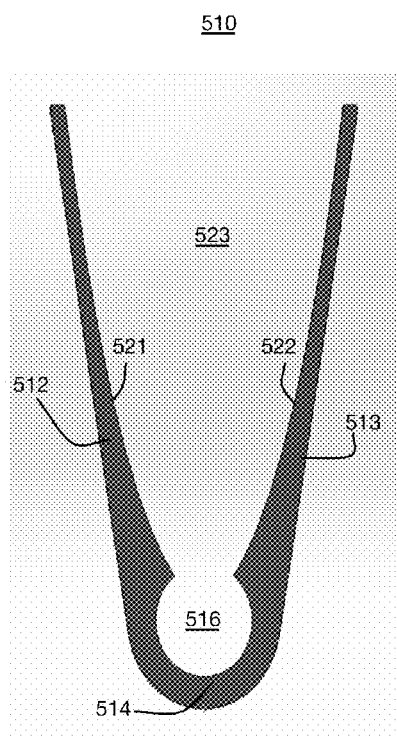
FIG. 5B shows a cross-sectional view of the structure of FIG. 5A.
Figure 5C:
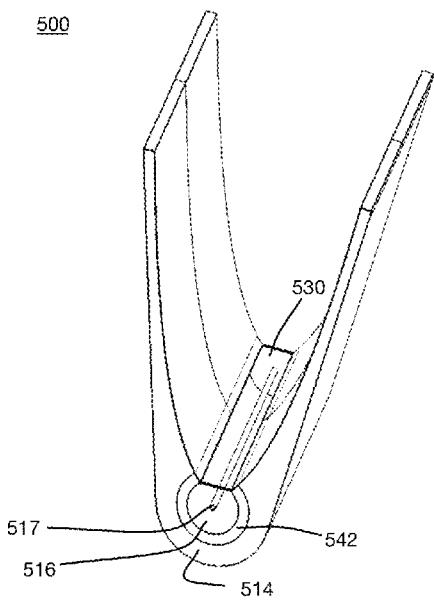
FIG. 5C shows a perspective view of an exemplary solar collector that includes the structure of FIG. 5A.
Figure 5D:
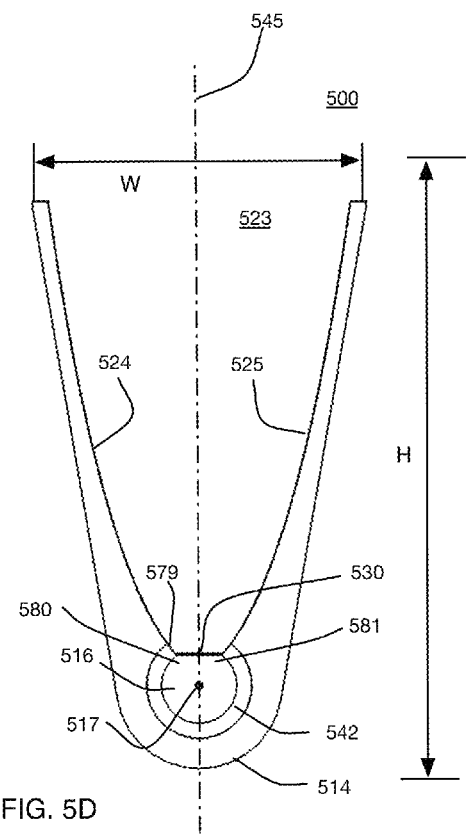
FIG. 5D shows a cross-sectional view of the solar collector of FIG. 5C.
Figure 5E:
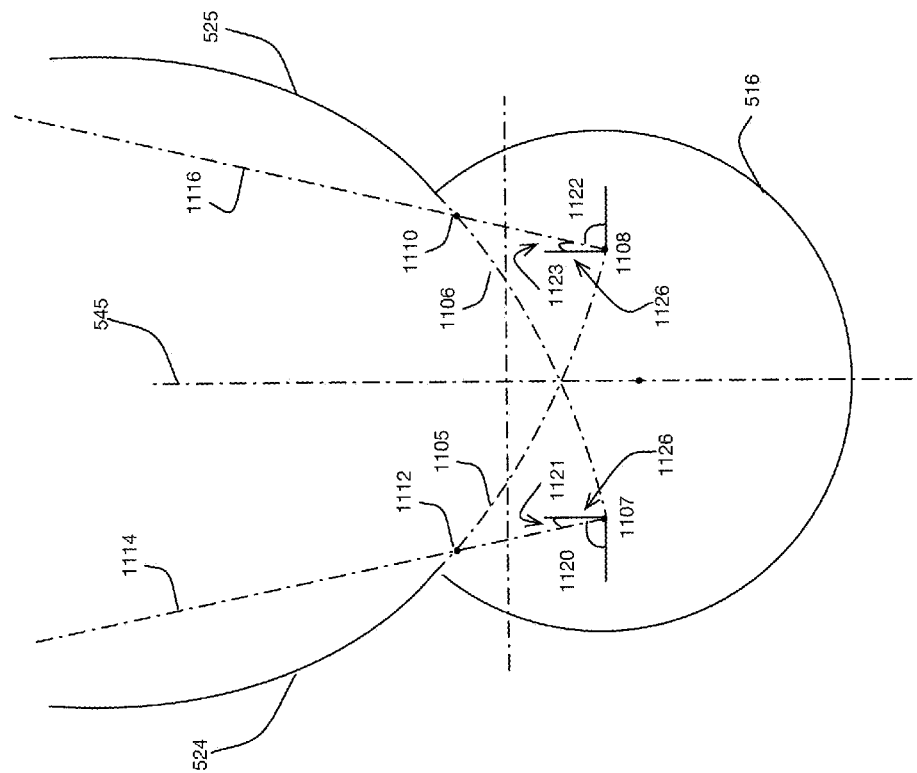
FIG. 5E shows an example of determining an angle of acceptance for the solar collector of FIG. 5C.
Figure 5F:
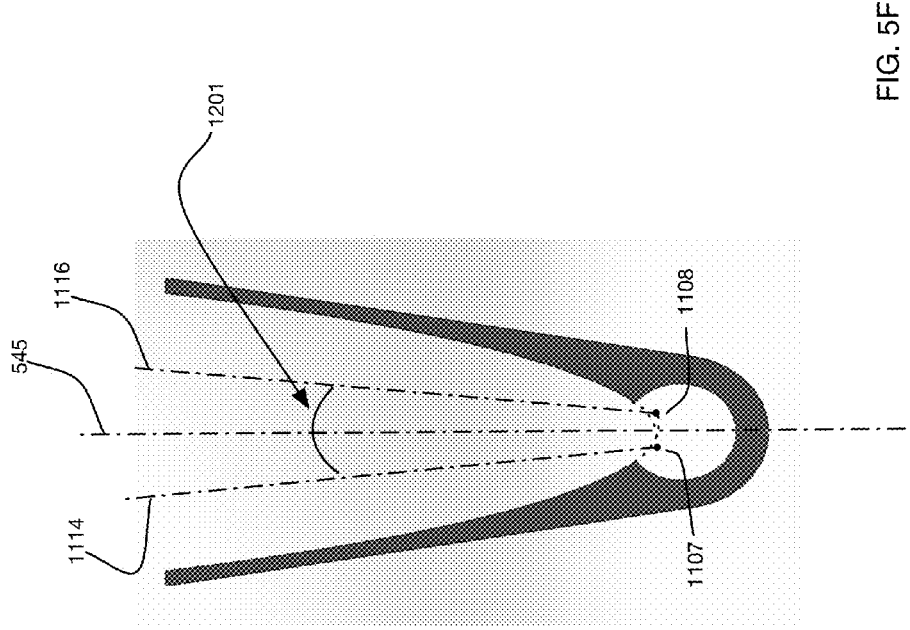
FIG. 5F shows the angle of acceptance for the solar collector of FIG. 5C.

Referring to FIGS. 5A-5D, another solar collector 500 is shown. FIG. 5A shows a perspective view of a structure 510 for the solar collector 500. FIG. 5B shows a cross-sectional view of the structure 510. FIG. 5C shows a perspective view of the assembled solar collector 500. FIG. 5D shows a cross-sectional view of the assembled solar collector 500. As compared to the solar collector 400, the solar collector 500 holds a cover 530 with an insulator and reflective surfaces instead of the structure 510, and the solar collector 500 has a smaller angle of acceptance.

Referring to FIGS. 5A and 5B, the structure 510 includes a bottom portion 514 and walls 512 and 513 that extend upward from the bottom portion 514. The structure 510 can be made out of any lightweight, durable material. For example, the structure 510 can be made of Styrofoam. The bottom portion 514 defines a cavity 516. Each of the walls 512 and 513 has an inner surface 521 and 522, respectively. In the structure 510, the cavity 516 is open to a region 523 that is between the inner surfaces 521 and 522.

Referring to FIG. 5C, a perspective view of the assembled solar collector 500 is shown. FIG. 5D shows a cross-sectional view of the assembled solar collector 500. The solar collector 500 defines a centerline 545, and the solar collector 500 has mirror symmetry about the centerline 545.

The solar collector 500 includes reflective surfaces 524 and 525 that are respectively formed on the inner surfaces 521 and 522 of the walls 512 and 513. The reflective surfaces 524 and 525 cover the entire inner surface 521 and 522 of the walls 512 and 513, respectively. The reflective surfaces 524 and 525 also cover a portion of the insulator 542 that contacts the inner surfaces 521 and 552. The reflective surfaces 524 and 525 can be, for example, sheet metal that is bent to conform to a curve of the walls 512 and 513 and then attached to the walls 512 and 513.

The reflective surfaces of 524 and 525 are bent into parabolas, each having a focus just below a bottom 579 of the opposite parabola. The bottom 579 of the parabola is the portion of the parabola that is closest to the cavity 516. The reflective surface 524 has a focus at a point 580, and the reflective surface 525 has a focus at a point 581. Locating the focus just below the bottom 579 of the opposite parabola can result in the reflected light being funneled down into the cavity 516 more effectively as compared to an implementation in which the focus is vertically displaced upwards from (above) the bottom 579, or at the bottom 579. For example, if the focus is at or above the bottom 579, incoming light can bounce off of the reflective surface 524, 525 of the opposite parabola without being absorbed.

The solar collector 500 includes a cover 530. The cover 530 is made from a material, such as plastic, glass, or Pyrex, which is transparent to sunlight and seals the cavity 516. Without the cover 530, the cavity 516 is open to the region 523. However, when in place, the cover 530 allows light to pass into the cavity 516 while also trapping fluid (such as air and other gasses) in the cavity 516. The trapped fluid fills the cavity and surrounds the vessel 517.

In use, the reflective surfaces 524 and 525 receive and reflect sunlight into the cavity 516. The reflected sunlight passes through the cover 530 into the cavity 516 and warms the fluid that is trapped in the cavity 516. The warmed trapped fluid heats a pipe 517, and a thermally absorbing material (such as water) in the pipe 517, by, for example, convection. Thus, the sunlight reflected by the reflective surfaces 524 and 525 heats the thermally absorbing material in the pipe 517 without being precisely focused on the pipe 517.

In the solar collector 500, the insulator 542 and the reflective surfaces 524 and 525 support the cover 530. This is different than the solar collector 400, which uses the cover holder 470, formed from the structure 410, to hold the cover 430. The cover 530 can become heated from transmitting sunlight and trapping heated fluids in the cavity 516. Placing the cover 530 in contact with the insulator 542 can protect the structure 510 from thermal damage that can occur from contacting the structure 510 to the cover 530, which can become heated due to exposure to concentrated reflected sunlight.

The solar collector 500 has a width "W" and a height "H." The width can be, for example, 40 inches (1.02 m). The height can be, for example, 75 inches (1.90 m). Other heights and widths can be used. The solar collector 500 can have an acceptance angle of 10°. In other words, the solar collector 500 can operate off-axis and can accept any radiation rays that have an angle relative to the solar collector 500 of up to 10°.

Referring to FIG. 5E, a schematic for determining an amount of curvature of the parabolic reflectors 524 and 525 is shown. The parabolic reflectors 524 and 525 are truncated where the reflectors 524 and 525 meet the cavity 516. The dotted lines 1105 and 1106 show the portion of the parabolic reflectors 524 and 525, respectively, that are not formed. Without truncation, the parabolic reflector 524 would extend to a vertex 1108, and the parabolic reflector 525 would extend to a vertex 1107. The parabolic reflector 524 has a focus 1110 (shown as 581 in FIG. 5E), and the parabolic reflector 525 has a focus 1112 (shown as 580 in FIG. 5D). The parabolic reflector 524 has a centerline 1116, and the parabolic reflector 525 has a centerline 1114. The centerline 1114 intersects the vertex 1107 and the focus 1112 and makes an angle 1120 relative to a horizontal line 1125 and an angle 1121 relative to a vertical line 1126. The centerline 1116 intersects the vertex 1108 and the focus 1110 and makes an angle 1122 relative to the horizontal line 1124 and an angle 1123 relative to the vertical line 1126. The angles 1121 and 1123 are relative to the vertical line 1126, which is parallel to the centerline 545 of the solar collector 500. Thus, the angles 1121 and 1123 are also relative to the centerline 545.

Referring also to FIG. 5F, an angle of acceptance 1201 for the solar collector 500 is shown. The solar collector accepts radiation that having an incident angle relative to the solar collector less than the angle of acceptance. The angle of acceptance 1201 relates to the amount of curvature of the parabolic reflector. In particular, the angle of acceptance for the solar collector is determined by the angles 1121 and 1123 (FIG. 5E). The angle of acceptance is the sum of the angles 1121 and 1123 (FIG. 5E).

In the exemplary collector 500 of FIG. 5F, the angle of acceptance 1201 is 10°. Thus, the angle of acceptance 1201 is smaller than that of the collector 200, which has an angle of acceptance of 54°. A smaller angle of acceptance can allow the collector aperture to be larger, thus enabling the solar collector to collect and concentrate relatively more light as compared to an implementation with a larger angle of acceptance. A smaller angle of acceptance also reduces the range of angles of incident light rays that enter the solar collector. For a collector with an angle of acceptance of 10°, only incident light rays having an angle of 10° or less relative to the solar collector enter the collector. By comparison, for a collector with an angle of acceptance of 54°, incident light rays having an angle of up to 54° relative to the collector can enter the collector. However, an acceptance angle of 5° or greater still provides a solar collector that requires minimal or no tracking of the sun to produce a sufficient amount of heated material.

The angles of acceptance of 10° and 54° are provided as examples. In other implementations, the angle of acceptance can have other values. For example, the angle of acceptance can be between 5° and 60°.

In some implementations, the vessel that receives the heat absorbing material (such as the vessel 117, the pipe 217, the vessel 417, or the vessel 517) can have fins. FIGS. 6A-6E, 7A, and 7B show exemplary vessels that include fins.

Figure 6B:
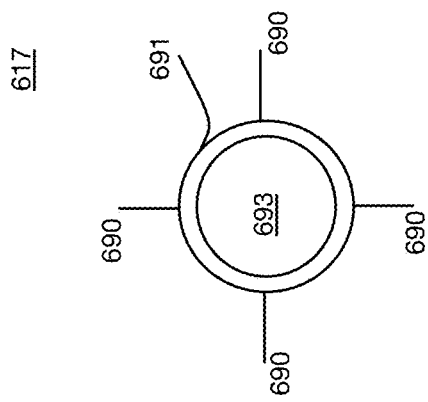
FIG. 6B shows a cross-sectional view of the vessel of FIG. 6A taken along line 6A-6A.
Figure 6A:
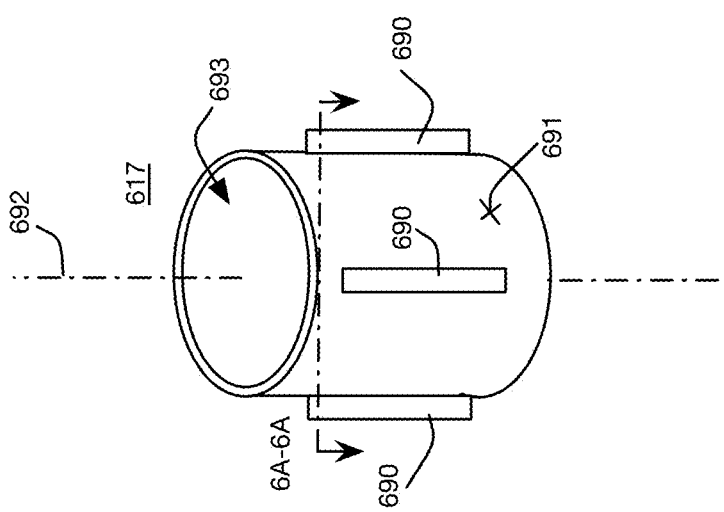
FIG. 6A shows a perspective view of an exemplary vessel for receiving a thermally absorbing material.

Referring to FIGS. 6A and 6B, an exemplary vessel 617 is shown. FIG. 6A shows a perspective view of the vessel 617, and FIG. 6B shows a cross-sectional view of the vessel 617 taken along the line 6A-6A. In the example shown, the vessel 617 is a tube or a pipe. The vessel 617 holds or transports a thermally absorbing material. The vessel 617 can be used in any of the solar collectors described above. For example, the vessel 617 can be used instead of the vessel 117, the pipe 217, the vessel 417, or the vessel 517.

The vessel 617 includes fins 690. The fins 690 extend outward from an exterior surface 691 of the vessel 617. The fins 690 can improve transfer of heat between the vessel 617 (and a thermally absorbing material inside the vessel 617) and the region surrounding the vessel 617. Thus, when the vessel 617 is used in a solar collector, the fins can help improve the use of the heated trapped fluid that is present in any of the solar collectors 100, 200, 400, or 500.

The fins 690 can extend from the exterior surface 691 with any geometry. For example, and referring to FIG. 6A, the fins 690 can be a plurality of separate fins that extend along the exterior surface 691 in a direction that is parallel to a longitudinal axis 692 defined by the vessel 617.

Figure 6D:
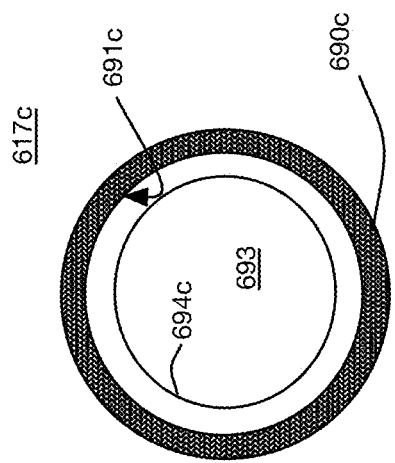
FIG. 6D shows a cross-sectional view of the vessel of FIG. 6C taken along line 6C-6C.
Figure 6C:
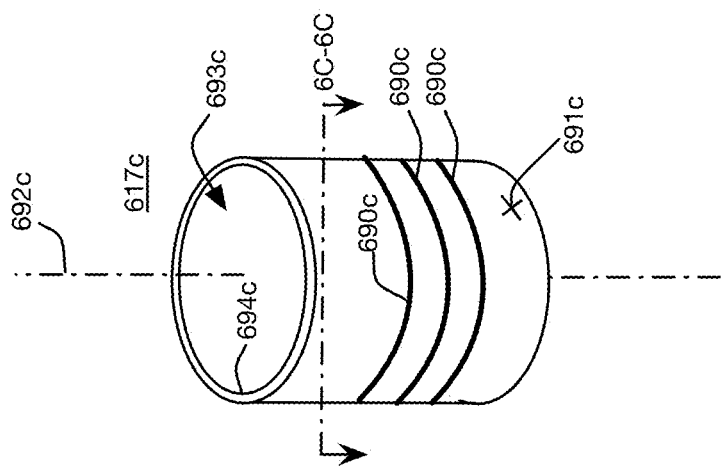
FIG. 6C shows a perspective view of another exemplary vessel for receiving a thermally absorbing material.

Other geometries are possible. Referring to FIG. 6C, a perspective view of an exemplary vessel 617c is shown. FIG. 6D is a cross-section of the vessel 617c taken along the line 6C-6C. The vessel 617c has a plurality of separate fins 690c that extend radially outward from an exterior surface 619c of the vessel 617.

Figure 6F:
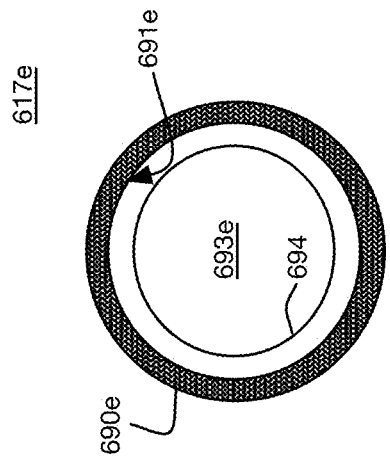
FIG. 6F shows a cross-sectional view of the vessel of FIG. 6E taken along line 6E-6E.
Figure 6E:
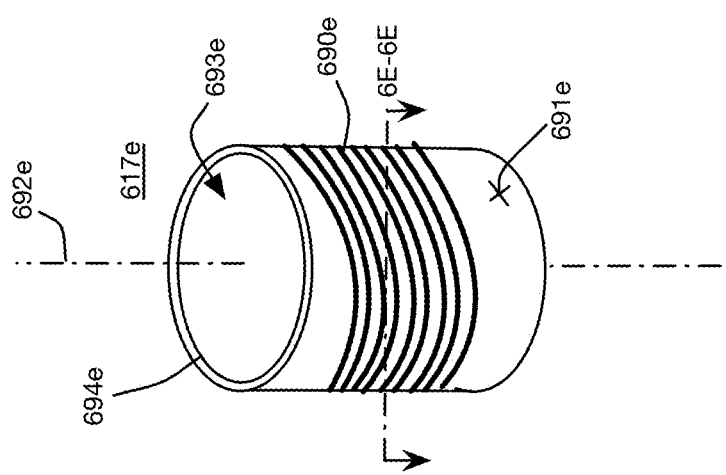
FIG. 6E shows a perspective view of another exemplary vessel for receiving a thermally absorbing material.

Referring to FIG. 6E, a perspective view of another exemplary vessel 617e is shown. FIG. 6F is a cross-section of the vessel 617e taken along the line 6E-6E. The vessel 617e has a fin 690e that extends outward from an exterior surface 691e. The fin 690e is wrapped about the vessel 617 in a helical pattern. The fin 690e can be made from a continuous piece of material or from a plurality of pieces of material. In other implementations, the fins can have an irregular pattern, such as spine-like fins that extend outward from the surface of the vessel and are spaced at random locations on the surface.

Figure 7B:
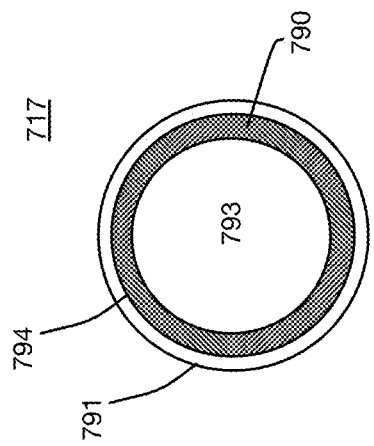
FIG. 7B shows a cross-sectional view of the vessel of FIG. 7A taken along line 7A-7A.
Figure 7A:
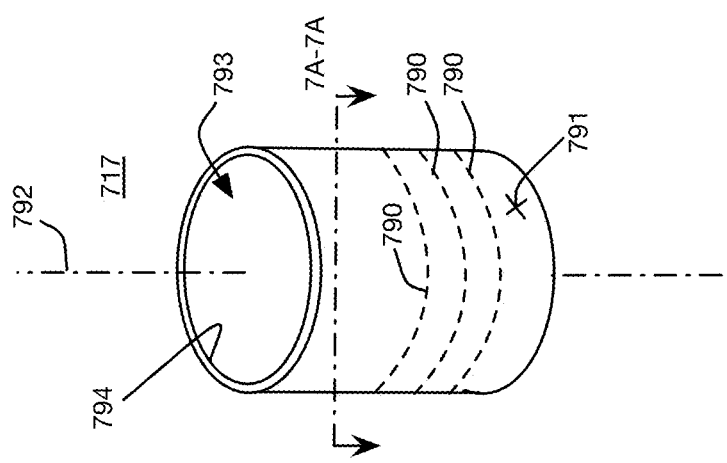
FIG. 7A shows a perspective view of another exemplary vessel for receiving a thermally absorbing material.

Referring to FIGS. 7A and 7B, another exemplary vessel 717 is shown. In the example shown, the vessel 717 is a tube or a pipe. The vessel 717 holds or transports a thermally absorbing material. The vessel 717 can be used instead of the vessel 117, the pipe 217, the vessel 417, or the vessel 517. As compared to the vessel 617 of FIGS. 6A-6E, the vessel 717 includes fins that are formed on an interior surface 794 of the vessel 717 and extend inward to an interior space 793. FIG. 7A shows a perspective view of the vessel 717, and FIG. 7B shows a cross-sectional view of the vessel 717 taken along the line 7A-7A.

In other implementations, the fins 790 can take other forms. For example, the fins 790 can be fins that extend radially inward into the interior space 793, a fin that extends into the surface 720 and forms a helical pattern on an inside wall of the vessel 717, or fins that form a random pattern on the inside wall of the vessel 717.

Figure 7D:
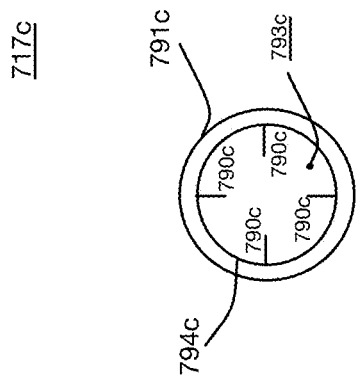
FIG. 7D shows a cross-sectional view of the vessel of FIG. 7C taken along line 7C-7C.
Figure 7C:
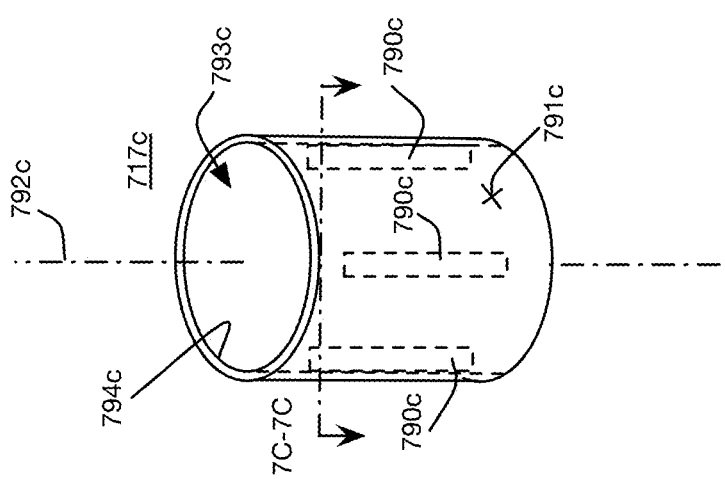
FIG. 7C shows a perspective view of another exemplary vessel for receiving a thermally absorbing material.

In another example, and referring to FIG. 7C, which shows a perspective view of a vessel 717c, and referring to FIG. 7D, which shows a cross-sectional view of the vessel 717c taken along the line 7C-7C, fins 790c extend inward from an interior surface 794 of the vessel 717c into an interior space 793c. The fins 790c extend along a longitudinal axis 792c of the vessel 717c. The fins 790c can extend along the entire longitudinal length of the vessel 717c or for a portion of the length. The fins 790c are shown as continuous pieces, but the fins 790c can be multiple pieces, either joined together or separated in space in a direction that is parallel to the longitudinal axis 792c.

Figure 8:
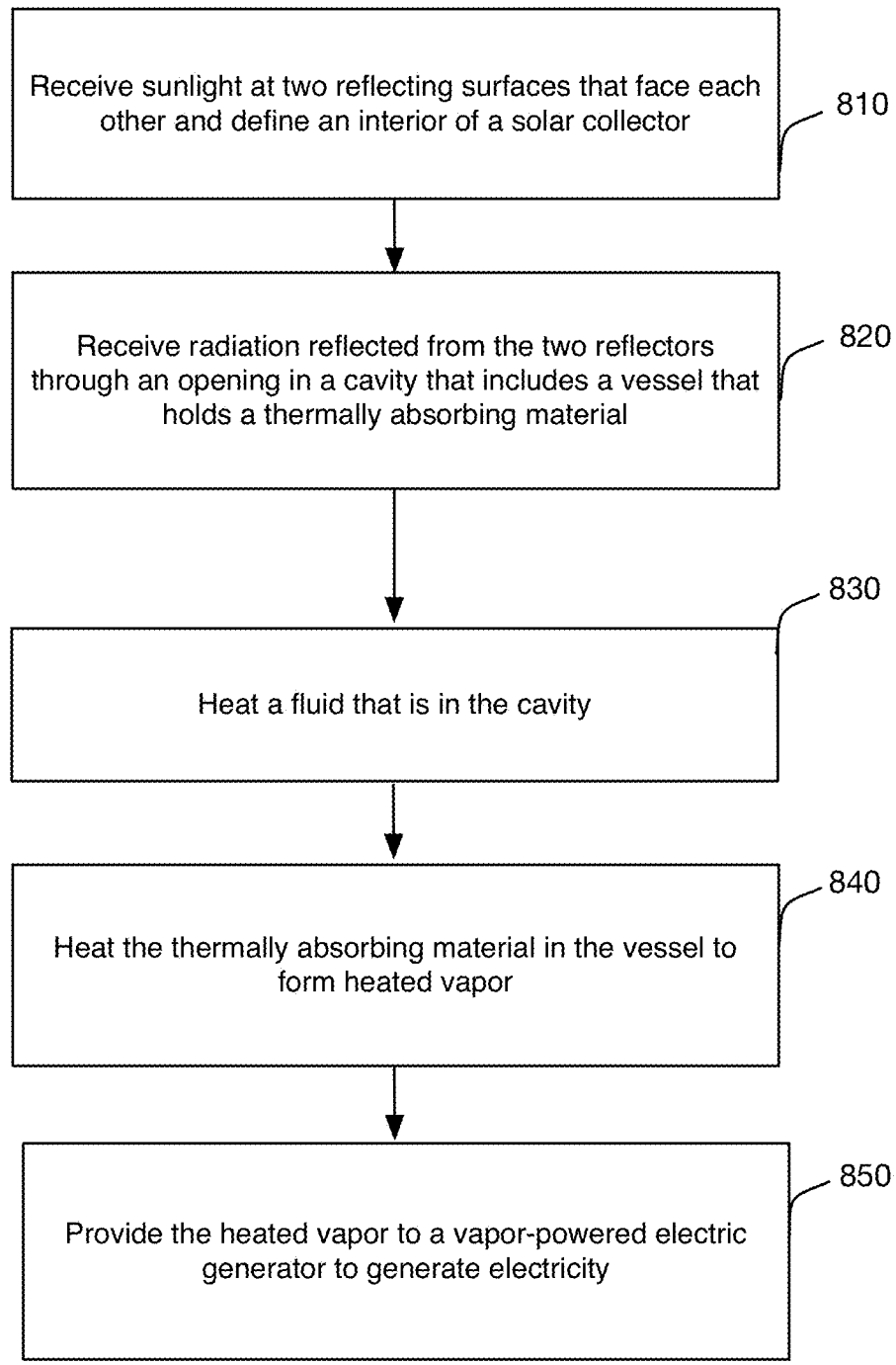
FIG. 8 is a flow chart of an exemplary process for producing electricity.
Figure 9:
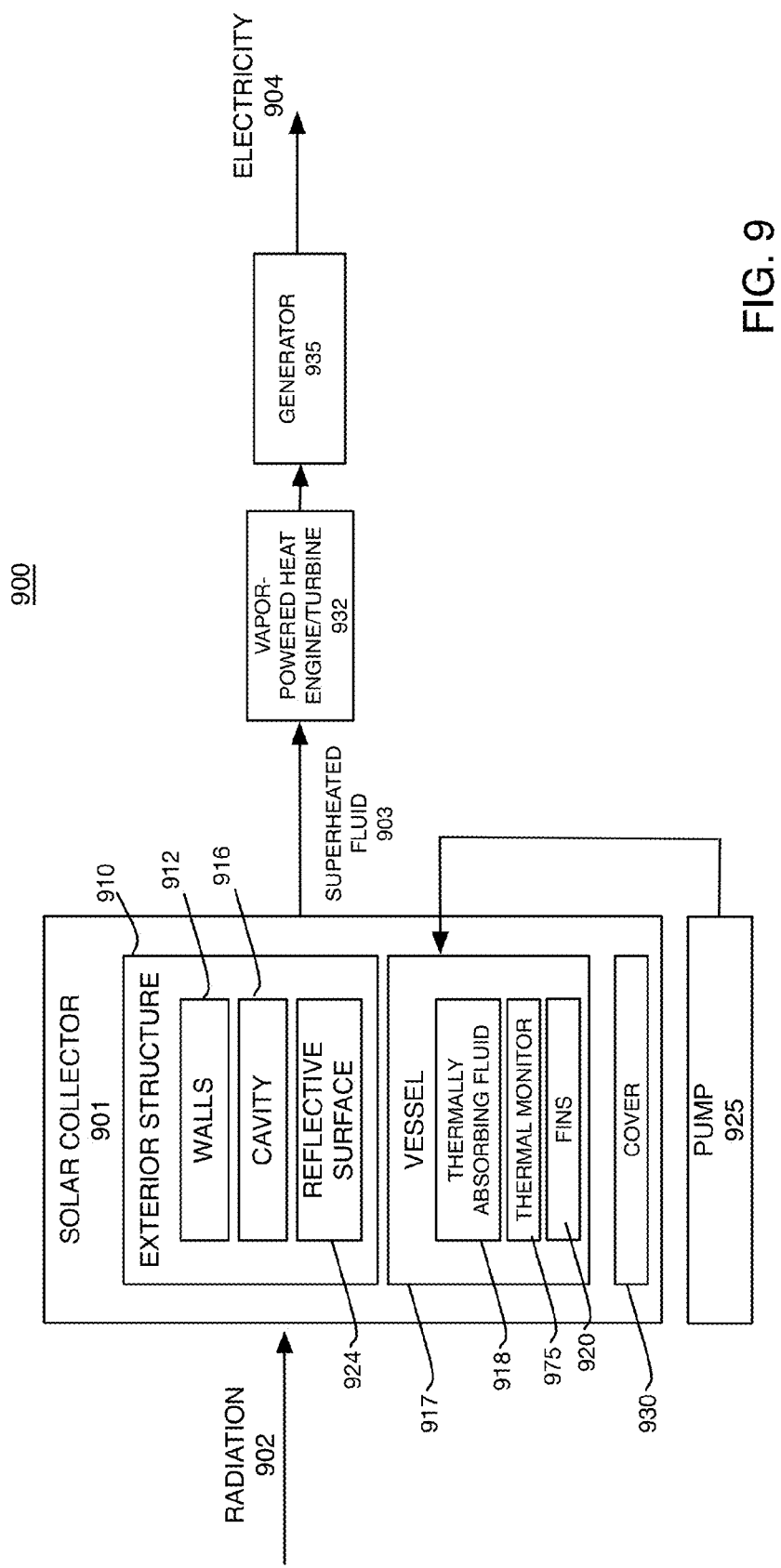
FIG. 9 is an exemplary system for producing electricity.

Referring to FIG. 8, a flow chart of an exemplary process 800 for generating electricity is shown. Referring also to FIG. 9, an exemplary system 900 for generating electricity is shown. The process 800 is discussed in the context of the system 900. However, the process 800 can be performed with the solar collector 100 (FIGS. 1A-1C), the solar collector 200 (FIGS. 2A-2E), the solar collector 400 (FIGS. 4A-4E), and/or the solar collector 500 (FIGS. 5A-5F).

Before describing the process 800, an overview of the system 900 is provided. The system 900 includes a solar collector 901, a heat engine 932, and a generator 935. The solar collector 901 receives radiation 902 and uses the radiation 902 to generate superheated steam 903. The solar collector 901 provides the superheated steam 903 to a vapor-powered heat engine 932, which converts the superheated steam to mechanical work. For example, an output of the heat engine 932 can spin or otherwise moves in response to the steam to drive the generator 935. The generator 935 produces electricity 904.

The solar collector 901 includes a structure 910 and a vessel 917. The solar collector 901 can be similar to any of the solar collectors 100, 200, 400, and 500 discussed above. The structure 910 includes a least one wall 912, a cavity 916 that is formed in a bottom portion of the structure 910, and at least one reflective surface 924 that directs sunlight into the cavity. The vessel 917 includes a thermally absorbing fluid 918. The vessel 917 also can include a thermal monitor 975 that measures the temperature of the vessel 917 and/or the thermally absorbing fluid 918 and fins 920 to improve the heat transfer between the cavity 916 and the thermally absorbing fluid 918.

The system 900 also can include a pump 925. The pump 925 can provide the thermally absorbing fluid 918 to the vessel 917. The pump 925 can have a fixed output or can operate under an active variable speed control to set the amount of fluid flow and/or the pressure of the heated fluid 903 that is delivered to the heat engine/turbine 932.

Referring to FIG. 8, sunlight is incident on two reflecting surfaces that face each other and at least partially define an interior of a solar collector (810). Radiation is incident on, or received by, the reflective surface 924. The reflective surface 924 can include more than one reflective surface, and the more than one reflective surfaces face each other. The reflective surfaces can be curved surfaces or the reflective surfaces can be flat. The reflective surfaces can be a reflective material that is molded onto a curved surface of the structure 910. The sunlight that is incident on the reflective surface 924 is reflected toward the cavity 916.

Radiation reflected from the reflective surfaces is received from the two reflectors through an opening in a cavity that includes a vessel that holds a thermally absorbing material (820). The reflected radiation can be sunlight. The thermally absorbing material can be, for example, water, a mixture of water and air, a gas entrained in a liquid, a liquid with solid particles or a solid component, a solid, a gel or gel-like material, or any other material that absorbs heat. In some implementations, the thermally absorbing material changes phase after absorbing a sufficient amount of heat.

The radiation that enters the cavity 916 is absorbed by the interior walls of the cavity, and the absorbed radiation is converted into heat and emitted into the cavity 916. The interior walls 912 of the cavity 916 can be painted black or another dark color to enhance the absorption of radiation. The cavity 916 can be covered by a cover 930, which traps fluids (such as air) in the cavity 916 and allows radiation that is reflected from the reflective surface 924 to pass through the cover and enter the cavity 916.

Fluid that is trapped in the cavity 916 by the cover is heated (830). The fluid that is trapped by the cavity 916 by the cover 930 is in thermal contact with the outside of the vessel 917 and heats the vessel 917 by, for example, convection. The trapped fluid fills the cavity 916 and at least partially surrounds the vessel 917. The trapped fluid is heated by the radiation that is transmitted through the cover 930 and by the heat that is emitted from the interior walls 912 of the cavity 916 or from other elements in the cavity 916 that absorb sunlight and emit heat. The cavity 916 includes the vessel 917, which holds the thermally absorbing material. Because the fluid that is trapped in the cavity 916 makes thermal contact with the vessel 917, heating the fluid that is trapped in the cavity 916 also heats the vessel 917 by convection. This process also heats the thermally absorbing material 918 that is in the vessel 917 by, for example, convection.

The thermally absorbing material 918 is heated to form a heated vapor (840). The heated vapor can be, for example, steam or a mixture of steam and water. The heated material can be or include a different phase of the thermally absorbing material. For example, the thermally absorbing material can be water in the form of a liquid, and the heated material can be superheated steam. The heated material is provided to the turbine/generator 935 to generate electricity (850). The energy from the heated vapor can be passed through the heat engine 932 to use the energy from the heated vapor 903 to perform rotational work or to spin the generator 935. In some implementations, 100 kW or hundreds of MW of electricity can be produced.

Figure 10:
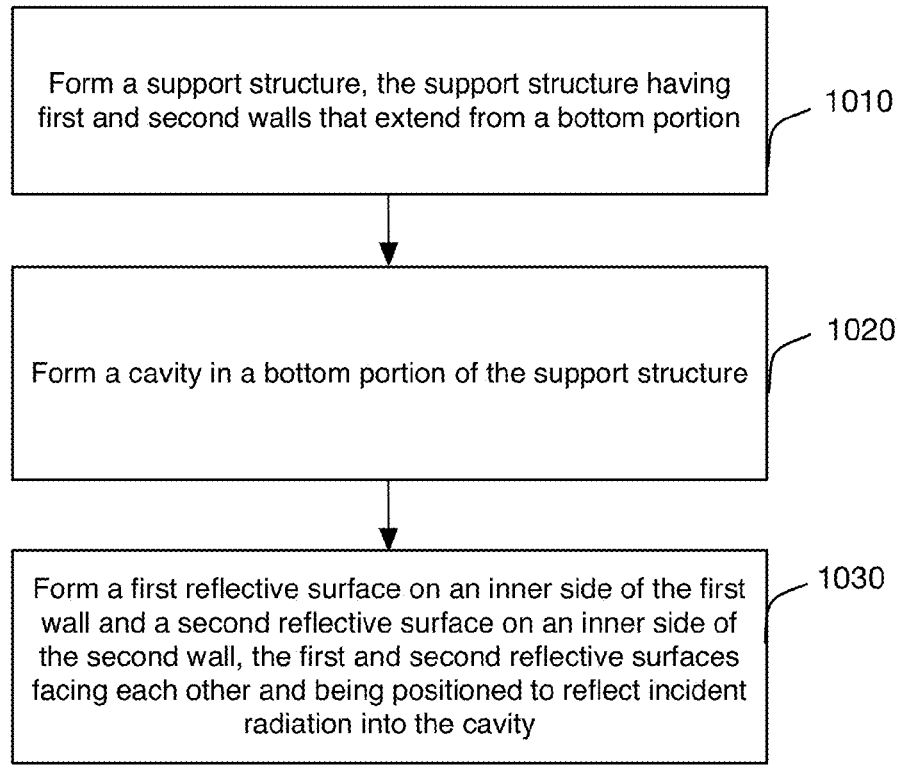
FIG. 10 is a flow chart of an exemplary process for assembling a solar collector.

Referring to FIG. 10, a flow chart for an exemplary process 1000 for assembling a solar collector is shown. The process 1000 can be used to form any of the structures 110, 210, 410, 510, or 910 discussed above.

A structure is formed (1010). The structure can be formed by cutting the structure from a larger block of material, gluing or otherwise attaching pieces together to form the structure, or by molding a material into the shape of the structure. For example, the structure can be formed by cutting a large block of Styrofoam with a hot wire machine. The structure can be a single piece integral element. The structure can be extruded from a custom Styrofoam mold or template. In some implementations, the structure is a single piece element that is formed by joining portions together with adhesive, snap interference fit, or any other kind of attachment. The structure can be made of discrete and separate portions that are held in place relative to each other with individual support structures.

The structure has a bottom portion and first and second walls that extend from a bottom portion. The structure can be made of any material that is sufficiently strong to hold to another structure and is a good insulator. For example, the structure can be made from polymer foam, Styrofoam, 1# Styrofoam blocks, or concrete. The structure can be made of concrete, or another relatively heavy and dense material, that is combined with a more lightweight material (such as Styrofoam) to make a structure that is lighter than a similar structure made entirely of the relatively heavy and dense material.

If the structure is made from a heavy material such as concrete, the structure can, in operation, sit directly on the ground or on a smooth surface so that the bottom portion (for example the bottom portion 214 of FIG. 2A) directly bears the weight of the structure. The bottom portion 214 can roll or tilt to allow the full structure to tilt. In these implementations, the vessel 217 accommodates lateral movement of the cavity 216, either by enlarging the cavity 216 or by attaching the endpoints of the vessel 217 to flexible endpoints. If a lightweight material, such as Styrofoam, is used, the entire structure can be suspended from periodically spaced supports to allow the vessel (for example, the vessel 217 of FIG. 2A) to remain in a fixed place so that the assembly rotates about this axis.

A cavity is formed in the bottom portion of the structure (1020). The cavity is open to a region (such as the regions 123, 223, 423, and 523) that is between the first and second walls. The cavity can have a radius between, for example, 7 inches (17.78 cm) and 9 inches (22.86 cm). The opening between the region and the cavity is also referred to as the "throat." The throat can be, for example, between about 3 inches (7.62 cm) and 9 inches (22.86 cm).

A first reflective surface is formed on an inner side of the first wall and a second reflective surface is formed on an inner side of the second wall (1030). The first and second reflective surfaces face each other and are positioned to reflect incident light into the cavity. The reflective surfaces can be any material that reflects sunlight. For example, the material can be metal, sheet metal, reflective tape, or a material that reflects sunlight and is backed with aluminum. The reflective surfaces can be formed by attaching the reflective material to the inner side of the first and/or second walls. The reflective surfaces can be formed by fitting, bending, and/or rolling the reflective material to conform to the curved inner sides of the first and second wall. The first and second reflective surfaces can be curved and can be shaped as parabolas, such as the reflective surfaces 524 and 525 of the solar collector 500. In some implementations, the parabolas are piecewise surface assembled from many smaller pieces of a reflective material. The piecewise surface can approximate parabolas by connecting or joining a series of flat surfaces to build up a curved surface that has a shape or curvature that is similar to that of a parabola. Thus, even though the individual pieces that make up the piecewise surface can be flat, the overall surface of the piecewise surface is curved.

Figures 11A, 11B:
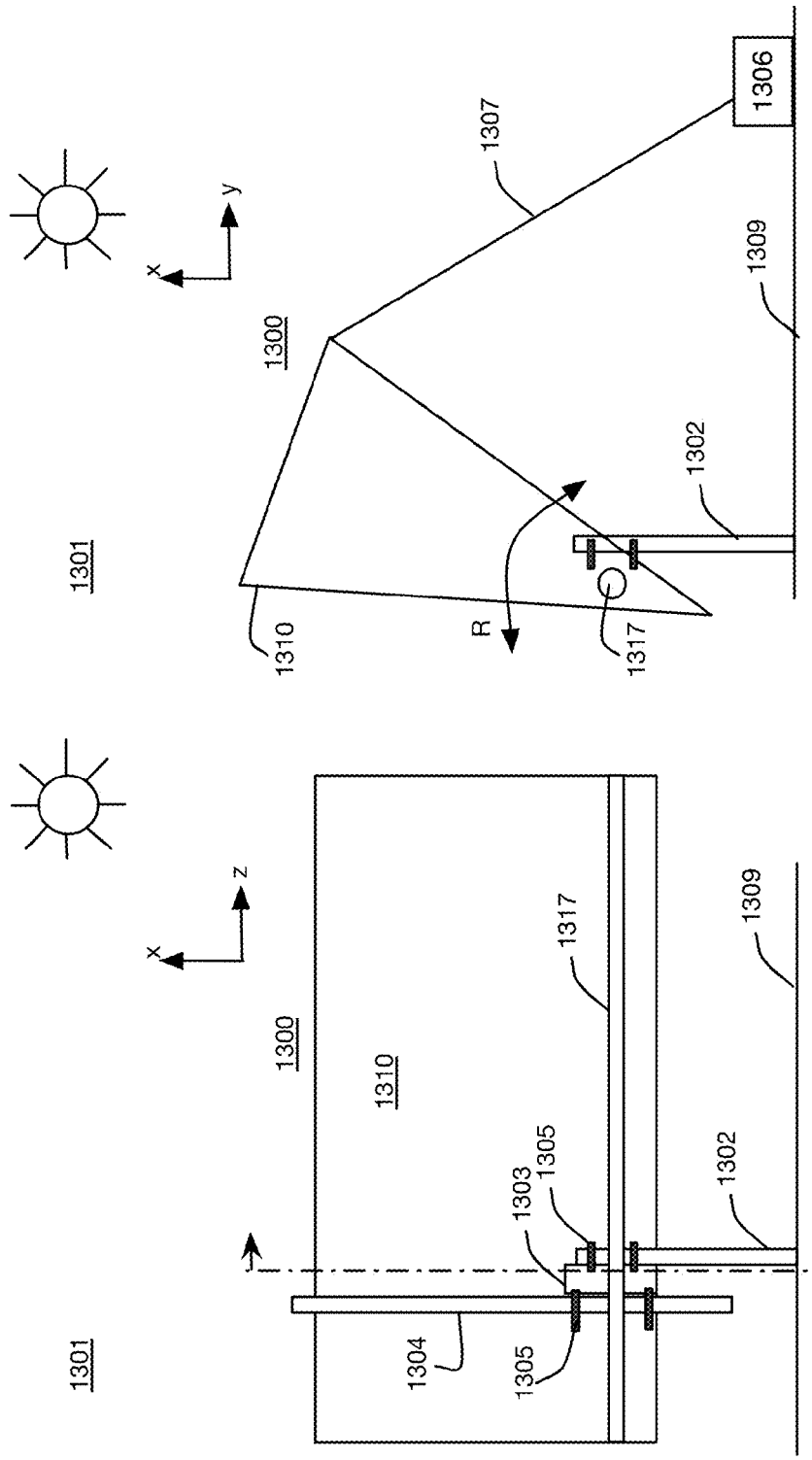
FIG. 11A shows a side view of a block diagram of an exemplary system that includes a solar collector.
FIG. 11B shows a cross-sectional view of the system of FIG. 11A taken along a line 11A-11A.

Referring to FIGS. 11A and 11B, a system 1301 that includes a solar collector 1300 that rotates through a range of angles "R" is shown. FIG. 11A shows a side view of the system 1301, and FIG. 11B shows a cross-sectional view of the system 1301 taken along a line 11A-11A.

The system 1301 includes a solar collector 1300 having a structure 1310 and a pipe 1317. The structure 1310 is similar to any of the structures 110, 210, 410, 510, and 910 discussed above. The system 1301 also includes a mounting structure 1302, a rotational bearing 1303, an end cap 1304. Together, the mounting structure 1302, the rotational bearing 1303, and the end cap 1304 form a rotation support assembly 1308. The system 1301 also includes an anchor support 1306 and an actuator 1307.

The mounting structure 1302, the rotational bearing 1303, and the end cap 1304 define an opening through which the pipe 1317 passes. The rotation support assembly 1308 holds the solar collector 1300 off of the surface of the Earth 1309 or away from another support structure, and the rotation support structure allows the solar collector 1300 to rotate relative to a radiation source through a range of angles "R." The pipe 1317 rests, without being rigidly held, in the opening define by the components of the rotation support assembly 1308. The pipe 3117 coincides with a pivot point of the system 1301, and the solar collector 1300 rotates about the pivot point. The pipe 1317 does not rotate when the solar collector 1300 rotates about the pivot point.

The mounting structure 1302 contacts the surface 1309 and holds the system 1301 above the surface 1309. The mounting structure 1302 is connected to the rotational bearing 1303 with a fixation 1305. The fixation 1305 can be, for example, a bolt. The rotational bearing 1303 is connected to the end cap 1304 with a fixation 1305. The rotational bearing 1303 includes an inner annulus (not shown) that is fixed to the mount and does not rotate. The rotational bearing 1303 also includes an outer annulus (not shown) that does rotate, and the end cap 1304 rotates with the outer annulus.

To rotate the solar collector 1300, the structure 1310 is connected to the end cap 1304, and the end cap 1304 or the structure 1310 is connected to the actuator 1307. The actuator 1307 has a variable length. Lengthening and shortening the actuator 1307 rotates the structure 1310 about the pivot point through the range of angles "R." For example, the actuator 1307 lengthens to rotate the structure 1310 about the pivot point and away from the anchor support 1306 and shortens to rotate the structure 1310 about the pivot point and toward the anchor support 1306. The pipe 1317 does not rotate when the structure 1310 rotates.

Other features are within the scope of the claims.

For example, although FIGS. 1A-1C and 2A the cavity 116 or 216 as being exposed at an end of the solar collector 100 or 200, in use, either or both of the ends of the solar collector 100 or 200 can be sealed. The vessel 117 and/or the pipe 217 can be supported within the cavity 116 or 216, respectively, with a support structure. The vessel 117 and/or the pipe 217 can be positioned to be off-center in its respective cavity 116, 216. Similarly, the solar collectors 400 and 500 can have sealed ends and a vessel that is not centered in their respective cavities 416 and 516.

The solar collector 100, 200, 400, 500, or 901 can be used without the cover 130, 230, 430, 530, or 930, respectively, in place.

Any of the structures 110, 210, 410, and 510 can be made from Styrofoam, 1# density Styrofoam blocks, polymer foam, or some other type of material, lightweight or otherwise, that holds a shape. Any of the reflective surfaces 124, 125, 224, 225, 424, 425, 524, 525, and 924 can be one or more of the following: reflective tape, metallic tape, polished metal, sheet metal, a reflective coating of a material that reflects sunlight, a reflective layer of a material that reflects sunlight, or a portion of the structure 110, 210, 410, 510, or 910, respectively, that is made from or includes a material that reflects sunlight.

The thermally absorbing material used in any of the structures described above can be, for example, water, a mixture of water and air, a gas entrained in a liquid, a liquid with solid particles or a solid component, a solid, a gel or gel-like material, or any other material that absorbs heat. The thermally absorbing material can be or include hydrocarbon oils, such as, for example, paraffin or mineral oil; a water/glycol solution; air; one or more chlorofluorocarbon (CFC) type refrigerant; one or more alcohol, such as, for example, isopropyl alcohol (IPA) or Ethyl Alcohol; a molten salt; or a plurality of molten salts. The thermally absorbing material can be a combination of any of these substances. The thermally absorbing material can change phase after absorbing a sufficient amount of heat.

Although example dimensions of the solar collectors are discussed, the solar collector can have other dimensions. For example, any of the solar collectors 100, 200, 400, 500, and 901 can be sized so that the collector can be installed, transported, maintained, and/or otherwise managed by one person.

The solar collector can be supported by supports other than that shown in FIGS. 11A and 11B. For example, the solar collector can be mounted onto a wheeled base. The solar collector can be operated without a separate mounting structure. For example, the solar collector can be placed directly on the ground, resting on its own weight. The solar collector can have a rounded bottom that allows it to pivot while resting on the ground.

What is claimed is:

1. An electromagnetic radiation collection apparatus comprising:
    an exterior comprising a bottom portion and first and second walls extending from the bottom portion, an inner surface of the bottom portion defining a cavity in the bottom portion, the bottom portion, the first wall, and the second wall comprising a first thermal insulator associated with a first melting temperature;
    a conduit comprising an outer surface that defines an inner space, the inner space of the conduit being configured to receive a thermally absorbing material and the outer surface being in the cavity, the inner space being in thermal communication with the outer surface such that heating the outer surface heats a thermally absorbing material in the interior of the conduit;
    a second thermal insulator associated with a second melting temperature that is greater than the first melting temperature, the second thermal insulator being positioned in the cavity with a first side adjacent to the inner surface of the bottom portion and a second, opposing side of the second thermal insulator facing the conduit, a gap in the second thermal insulator defining an opening between the cavity and a bottom of the first wall and a bottom of the second wall;
    a radiation collector comprising:
        a first curved surface on an interior of the first wall, the first curved surface being at least partially reflective, having a first focal point, and positioned to reflect radiation that is incident on the first surface into the cavity; and
        a second curved surface on an interior of the second wall, the second curved surface being at least partially reflective, having a second focal point, and positioned to reflect radiation that is incident on the second surface into the cavity, wherein the first and second surfaces face each other to at least partially define an interior region of the radiation collector, and the first focal point and the second focal point are below the bottom of the second wall and the bottom of the first wall, respectively, and are in the cavity; and
        a transmissive material that covers the opening and fluidly seals the cavity, the transmissive material being in physical contact with the second thermal insulator such that the transmissive material and the second thermal insulator define a boundary of a space in the cavity, the transmissive material configured to transmit radiation from the interior region of the radiation collector to the space in the cavity, the exterior surface of the conduit being in thermal communication with a fluid in the space in the cavity such that heating the fluid in the space in the cavity heats the exterior surface of the conduit, wherein
        the cavity comprises a cross-sectional width at the opening, the cross-sectional width of the cavity increasing with distance from the opening to a maximum cross-sectional width, the cross-sectional width at the opening is smaller than a cross-sectional width of a portion of the interior region that is immediately adjacent to the opening and smaller than a cross-sectional width of a portion of the cavity that is immediately adjacent to the opening, radiation reflected into the cavity through the transmissive material that covers the opening propagates in the space in the cavity defined by the boundary by reflecting from one portion of the boundary of the space to another portion of the boundary of the space or is absorbed by one or more of the second thermal insulator, the fluid, or the outer surface of the conduit, the radiation remaining in the space until substantially all of the radiation that enters the cavity through the transmissive material is absorbed by one or more of the second thermal insulator, the fluid, or the outer surface of the conduit in the space, and the conduit is positioned in the space in which the radiation propagates and the outer surface of the conduit is surrounded by the boundary.

2. The electromagnetic radiation collection apparatus of claim 1, wherein radiation that enters the radiation collector at any angle is reflected toward the cavity without using an optic that is separate from the electromagnetic radiation collection apparatus.

3. The electromagnetic radiation collection apparatus of claim 1, wherein the conduit defines a longitudinal axis, the conduit and the cavity are centered on the longitudinal axis, and the first and second surfaces extend along the longitudinal axis.

4. The electromagnetic radiation collection apparatus of claim 1, wherein the conduit comprises a fin that extends radially outward from the outer surface of the conduit.

5. The electromagnetic radiation collection apparatus of claim 1, wherein
the first thermal insulator comprises a polymer foam, and the first wall, the second wall, and the bottom portion are made of a single-piece of the polymer foam that forms a structure.

6. The electromagnetic radiation collection apparatus of claim 1, wherein the first and second curved surfaces comprise one or more of reflective tape, reflective paint, reflective Aluminum tape, sheet metal, polished metal, or sheet metal having a reflective coating.

7. The electromagnetic radiation collection apparatus of claim 1, wherein the first thermal insulator comprises a polymer foam, and the first wall and the second wall comprise a single-piece of the polymer foam that provides support, and the first and second curved surfaces comprise one or more of reflective tape, reflective Aluminum tape, reflective paint, or a metallic material.

8. The electromagnetic radiation collection apparatus of claim 1, wherein:
the first thermal insulator comprises a polymer foam, and the first wall and the second wall further comprise sheet metal,
the first and second curved surfaces comprise one or more of reflective tape, reflective paint, reflective Aluminum tape, or a metallic material, and
the second thermal insulator thermal insulator comprises one or more of fiberglass, calcium silicate, and rockwool.

9. The electromagnetic radiation collection apparatus of claim 1, wherein the first and second curved surfaces comprise a reflective layer on the first thermal insulator.

10. The electromagnetic radiation collection apparatus of claim 1, wherein the first and second curved surfaces reflect sunlight.

11. The electromagnetic radiation collection apparatus of claim 1, wherein the first and second walls are integral with the bottom portion and the radiation collection apparatus comprises a single piece of the first thermal insulator.

12. The electromagnetic radiation collection apparatus of claim 1, further comprising an optically absorbing material that absorbs light and emits heat.

13. A method of generating electricity, the method comprising:
receiving sunlight at two curved reflectors that face each other and define an interior of a solar collector, the curved reflectors extending from a bottom portion, the two curved reflectors and the bottom portion comprising a first thermal insulator associated with a first melting point, the curved reflectors positioned to reflect the received sunlight to two respective focal points in a cavity defined by the bottom portion, a second thermal insulator associated with a second melting point greater than the first melting point positioned in the cavity with a first side adjacent to an inner side of the bottom portion, the two focal points being positioned below the two curved reflectors, a vessel being in and at least partially surrounded by the cavity, the vessel comprising an inner surface that receives a thermally absorbing material and the vessel being positioned away from the two focal points;
receiving the sunlight reflected from the two curved reflectors through an opening, the opening being covered by a material that transmits the reflected sunlight into the cavity and seals a fluid in the cavity, the material that transmits the reflected sunlight and the second thermal insulator defining a boundary of a space in the cavity;
allowing the sunlight that passes through the material that transmits the reflected sunlight to propagate in the space in the cavity by reflecting the sunlight from one portion of the boundary to another portion of the boundary, the sunlight remaining in the cavity until substantially all of the sunlight is absorbed in an interior of the cavity by one of the second thermal insulator, the fluid in the cavity, or the vessel;
heating the thermally absorbing material to form a heated vapor, the heated vapor being a different phase than the thermally absorbing material; and
providing the heated vapor to a vapor-powered heat engine that is connected to an electric generator to generate electricity.

14. A solar radiation collector comprising:
an exterior comprising a bottom portion and first and second walls extending from the bottom portion, the exterior defining a cavity in the bottom portion, the bottom portion, the first wall, and the second wall comprising a first thermal insulator, the first thermal insulator being associated with a first melting temperature;
a first surface on an interior of the first wall, the first surface being at least partially reflective and positioned to reflect and focus sunlight that is incident on the first surface toward a first focus point below the second wall and in the cavity;
a second surface on an interior of the second wall, the second surface being at least partially reflective and positioned to reflect and focus sunlight that is incident on the second surface toward a second focus point that is below the first wall and in the cavity, the first surface and the second surface facing each other and defining a space therebetween;

a pipe disposed in the cavity at a position that does not overlap with the first focus point or the second focus point, the pipe comprising an outer surface that defines an inner space, the inner space of the pipe being configured to receive a thermally absorbing material;

a second thermal insulator associated with a second melting point that is higher than the first melting point, the second thermal insulator being positioned in the cavity with a first side adjacent to an inner surface of the bottom portion and a second side facing the pipe such that the second thermal insulator is between the pipe and the bottom portion; and a cover positioned over an opening formed between the cavity and the space, the cover sealing the cavity from the space, the cover and the second thermal insulator defining a boundary of a space in the cavity, and the cover being transparent to sunlight, wherein the cavity comprises a curved interior wall and at least a portion of the boundary is curved, and sunlight passing through the cover into the space in the cavity propagates within the space in the cavity by being reflected from one portion of the boundary to another portion of the boundary, the pipe is positioned such that all portions of the outer surface that are in the space in the cavity receive radiation that propagates in any direction in the space in the cavity, the sunlight remaining in the space in the cavity until substantially all of the sunlight is absorbed at one or more of the second thermal insulator, a fluid in the space in the cavity, or the outer surface of the pipe disposed in the cavity.

15. The solar radiation collector of claim 14, further comprising an optical absorbing material that absorbs light and emits heat on one or more of the second side of the second thermal insulator and the outer surface of the pipe.

16. The electromagnetic radiation collection apparatus of claim 1, wherein the location of the conduit does not overlap the first focal point or the second focal point.

17. The electromagnetic radiation collection apparatus of claim 12, wherein the optically absorbing material is on one or more of the second surface of the second thermal insulator and the outer surface of the conduit.

18. The solar radiation collector of claim 14, wherein
the first wall comprises polymer foam, and
the second wall comprises polymer foam.

19. The electromagnetic radiation collection apparatus of claim 1, wherein
the cavity comprises a thermally conductive fluid that is distinct from the thermally absorbing material.

20. The electromagnetic radiation collection apparatus of claim 18, wherein the polymer foam comprises Styrofoam.

21. The electromagnetic radiation collection apparatus of claim 1, wherein substantially all of the radiation that is reflected into the cavity is absorbed in the cavity by being absorbed at one or more of the second side of the second thermal insulator or the outer surface of the conduit.

22. The electromagnetic radiation collection apparatus of claim 12, wherein the optical absorption material comprises a black or dark material that absorbs incident sunlight.

23. The electromagnetic radiation collection apparatus of claim 1, wherein the thermally absorbing material is configured to change to a gas phase after absorbing heat.

24. The method of claim 13, wherein the thermally absorbing material comprises water, and the super-heated vapor comprises super-heated steam.

25. The electromagnetic radiation collection apparatus of claim 5, wherein the structure has a height in a first direction, a width in a second direction, and a length in a third direction, the first, second, and third directions being distinct directions that are orthogonal to each other, the height being at least 1.2 meters, and the width being at least 1 meter.

26. The solar radiation collector of claim 14, wherein the first thermal insulator comprises a polymer foam, and the second thermal insulator thermal insulator comprises one or more of fiberglass, calcium silicate, and rockwool.

* * * * *

UNITED STATES PATENT AND TRADEMARK OFFICE
CERTIFICATE OF CORRECTION

| | | |
|---|---|---|
| PATENT NO. | : 9,194,378 B2 | Page 1 of 1 |
| APPLICATION NO. | : 13/930012 | |
| DATED | : November 24, 2015 | |
| INVENTOR(S) | : Timothy James Sayer et al. | |

It is certified that error appears in the above-identified patent and that said Letters Patent is hereby corrected as shown below:

On Title page, Item 72, delete "Brian" and insert --Brandon--, therefor.

Signed and Sealed this
Eighth Day of March, 2016

Michelle K. Lee
*Director of the United States Patent and Trademark Office*